(12) United States Patent
Tabet et al.

(10) Patent No.: US 10,728,937 B2
(45) Date of Patent: Jul. 28, 2020

(54) SYNCHRONIZATION AND MASTER INFORMATION BLOCK FOR OFF GRID RADIO SERVICE

(71) Applicant: Apple Inc., Cupertino, CA (US)

(72) Inventors: Tarik Tabet, Los Gatos, CA (US); Lydi Smaini, San Jose, CA (US); Venkateswara Rao Manepalli, Sunnyvale, CA (US); Matthias Sauer, San Jose, CA (US); Ronald W. Dimpflmaier, Los Gatos, CA (US); Farouk Belghoul, Campbell, CA (US); Christian W. Mucke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 15/863,701

(22) Filed: Jan. 5, 2018

(65) Prior Publication Data

US 2018/0199388 A1 Jul. 12, 2018

Related U.S. Application Data

(60) Provisional application No. 62/444,177, filed on Jan. 9, 2017, provisional application No. 62/462,260, filed on Feb. 22, 2017, provisional application No. 62/464,260, filed on Feb. 27, 2017.

(51) Int. Cl.
*H04W 76/14* (2018.01)
*H04W 56/00* (2009.01)
*H04W 72/04* (2009.01)
*H04W 8/00* (2009.01)

(52) U.S. Cl.
CPC ......... *H04W 76/14* (2018.02); *H04W 56/002* (2013.01); *H04W 56/0035* (2013.01); *H04W 56/0095* (2013.01); *H04W 72/0446* (2013.01); *H04W 8/005* (2013.01)

(58) Field of Classification Search
None
See application file for complete search history.

(56) References Cited

U.S. PATENT DOCUMENTS

| 9,615,340 | B2 | 4/2017 | Abedini et al. | |
|---|---|---|---|---|
| 2015/0078297 | A1* | 3/2015 | Zheng | H04W 76/14 370/329 |
| 2015/0215903 | A1* | 7/2015 | Zhao | H04W 72/04 370/329 |
| 2016/0135240 | A1* | 5/2016 | Yoon | H04W 76/14 370/329 |

(Continued)

*Primary Examiner* — Chi H Pham
*Assistant Examiner* — Raul Rivas
(74) *Attorney, Agent, or Firm* — Kowert, Hood, Munyon, Rankin & Goetzel, P.C.

(57) ABSTRACT

This disclosure relates to techniques for supporting narrowband device-to-device (D2D) wireless communication, including possible techniques for providing synchronization and master information block signals in an off grid radio system. A wireless device may provide D2D synchronization signals for a D2D communication group. The D2D synchronization signals may be provided using multiple frequency channels. The D2D synchronization signals may be provided on each respective frequency channel of the frequency channels during a respective portion of a D2D synchronization signal cycle in a sequential manner.

20 Claims, 23 Drawing Sheets

(56) References Cited

U.S. PATENT DOCUMENTS

2017/0013578 A1    1/2017  Wei et al.
2017/0105240 A1*  4/2017  Chen .................... H04W 92/18
2018/0270776 A1*  9/2018  Yasukawa ......... H04W 56/0025

* cited by examiner

SYNCHRONIZATION AND MASTER INFORMATION BLOCK FOR OFF GRID RADIO SERVICE

PRIORITY INFORMATION

This application claims priority to U.S. provisional patent application Ser. No. 62/444,177, entitled "Narrowband Device to Device Communication," filed Jan. 9, 2017, U.S. provisional patent application Ser. No. 62/462,260, entitled "Synchronization and MIB for OGRS," filed Feb. 22, 2017, and U.S. provisional patent application Ser. No. 62/464,260, entitled "Synchronization and Master Information Block for Off Grid Radio Service," filed Feb. 27, 2017, which are hereby incorporated by reference in their entirety as though fully and completely set forth herein.

TECHNICAL FIELD

The present application relates to wireless communication, including to techniques for performing narrowband device-to-device wireless communication.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. Therefore, improvements in the field are desired.

SUMMARY

Embodiments are presented herein of, inter alia, systems, apparatuses, and methods for performing narrowband device-to-device wireless communication.

As noted above, the number of use cases for different classes of wireless devices with widely variable capabilities and usage expectations are growing. While many wireless communication systems primarily utilize infrastructure mode type communications, e.g., in which one or more base stations and potentially a supporting network are used as intermediaries between endpoint devices, one possible use case for wireless communication includes direct device-to-device communications. This disclosure presents various techniques for supporting such communications, including techniques for relatively long range narrowband communication with features for supporting such communication when 'out of service' with respect to cellular network operated infrastructure such as cellular base stations. Possible details/features of synchronization techniques and master information block structure and transmission techniques for direct device-to-device communications are included among the features described herein.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
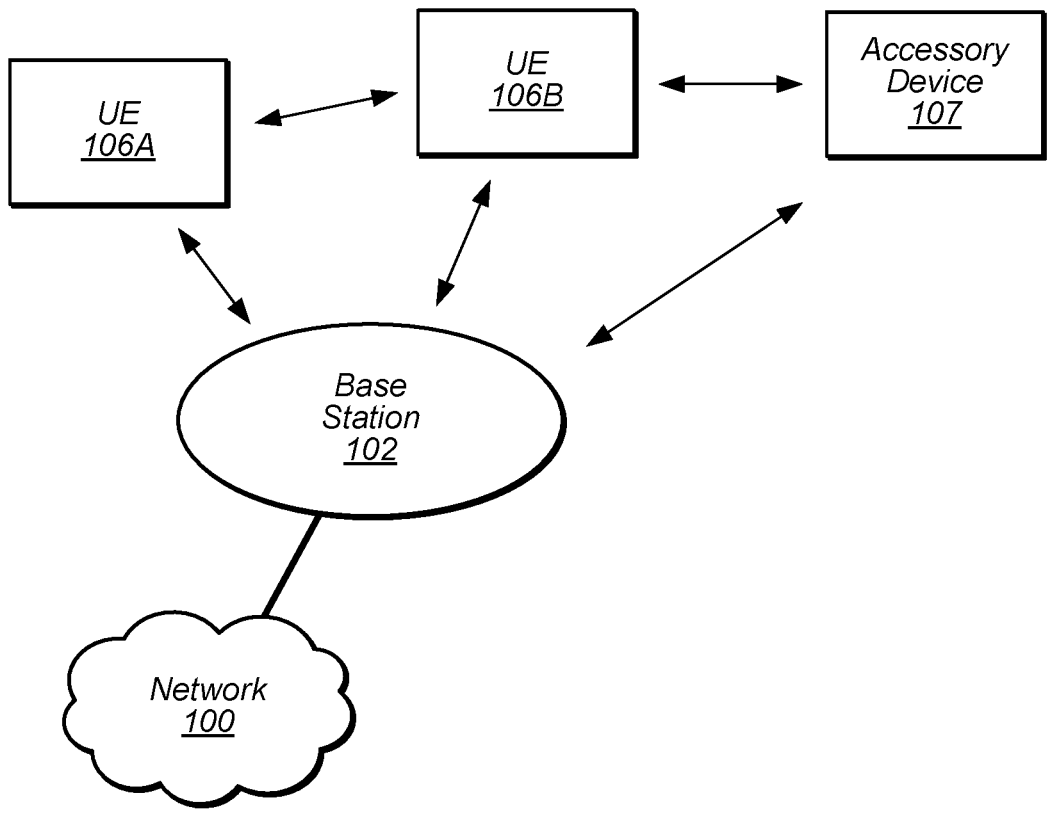
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
OGRS: Off Grid Radio Service
IoT: Internet of Things
NB: Narrowband
D2D: device-to-device
OOC: out-of-coverage Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
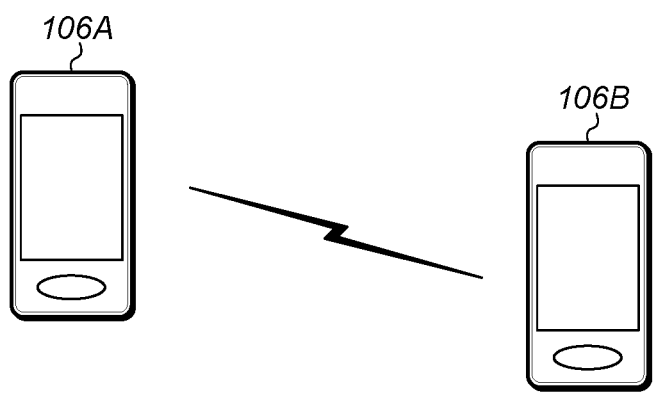
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107.

Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, OGRS, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-B and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, OGRS, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, according to at least some aspects of this disclosure, the UE 106A and UE 106B may be capable of arranging and performing narrowband D2D communication with each other even when out-of-coverage of the BS 102 and other cellular base stations.

FIG. 2 illustrates example UE devices 106A, 106B in D2D communication with each other. The UE devices 106A, 106B may be any of a mobile phone, a tablet, or any other type of hand-held device, a smart watch or other wearable device, a media player, a computer, a laptop or virtually any type of wireless device.

The UEs 106A, 106B may each include a device or integrated circuit for facilitating cellular communication, referred to as a cellular modem. The cellular modem may include one or more processors (processing elements) and various hardware components as described herein. The UEs 106A, 106B may each perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UEs 106A, 106B may include one or more antennas for communicating using two or more wireless communication protocols or radio access technologies. In some embodiments, one or both of the UE 106A or UE 106B might be configured to communicate using a single shared radio. The shared radio may couple to a single antenna, or may couple to multiple antennas (e.g., for MIMO) for performing wireless communications. Alternatively, the UE 106A and/or UE 106B may include two or more radios. Other configurations are also possible.

Figure 3:
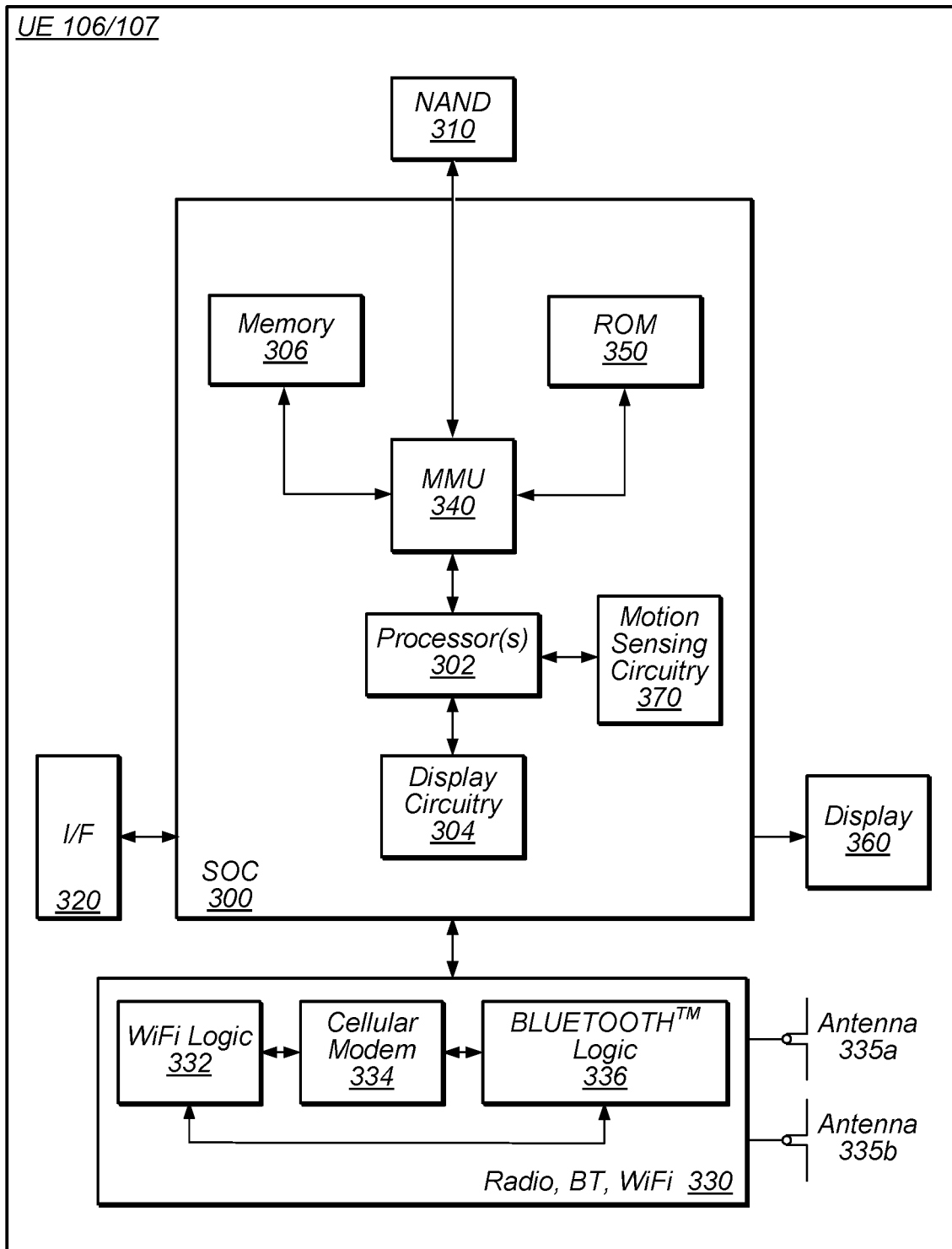
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, OGRS, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RAT s).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
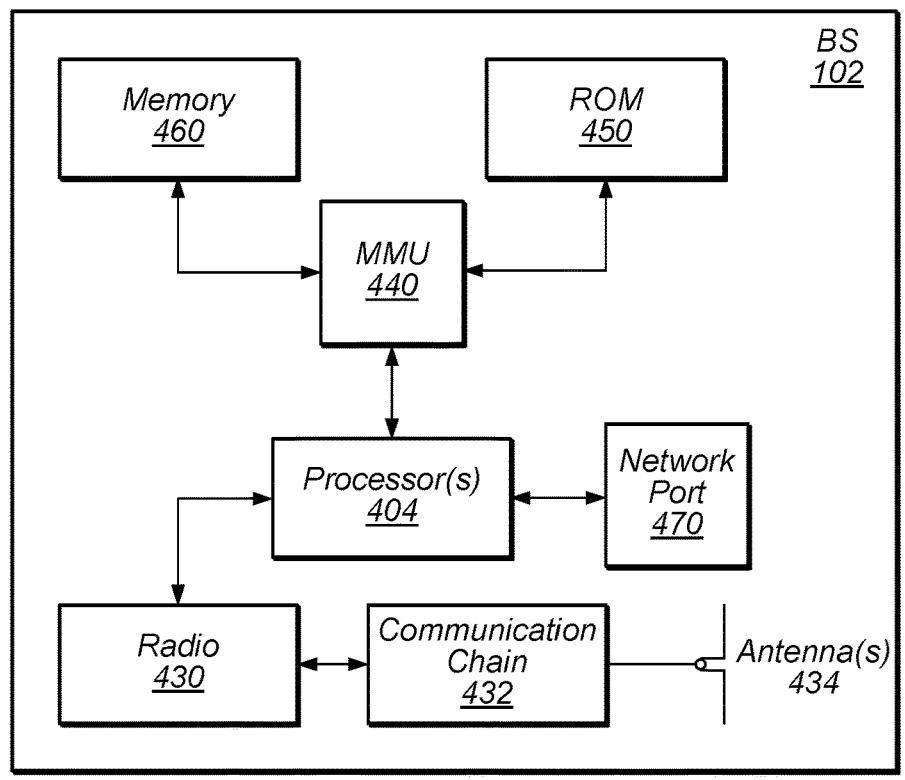
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, OGRS, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. For example, while many of the features described herein relate to device-to-device communication that can be performed by UE devices without relying on an intermediary base station, a cellular base station may be configured to also be capable of performing device-to-device communication in accordance with the features described herein. As another possibility, the BS 102 may be instrumental in configuring a UE 106 to perform narrowband device-to-device communication according to the features described herein, and/or certain features described herein may be performed or not performed by a device based at least in part on whether there is a BS 102 providing cellular service within range of the device. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
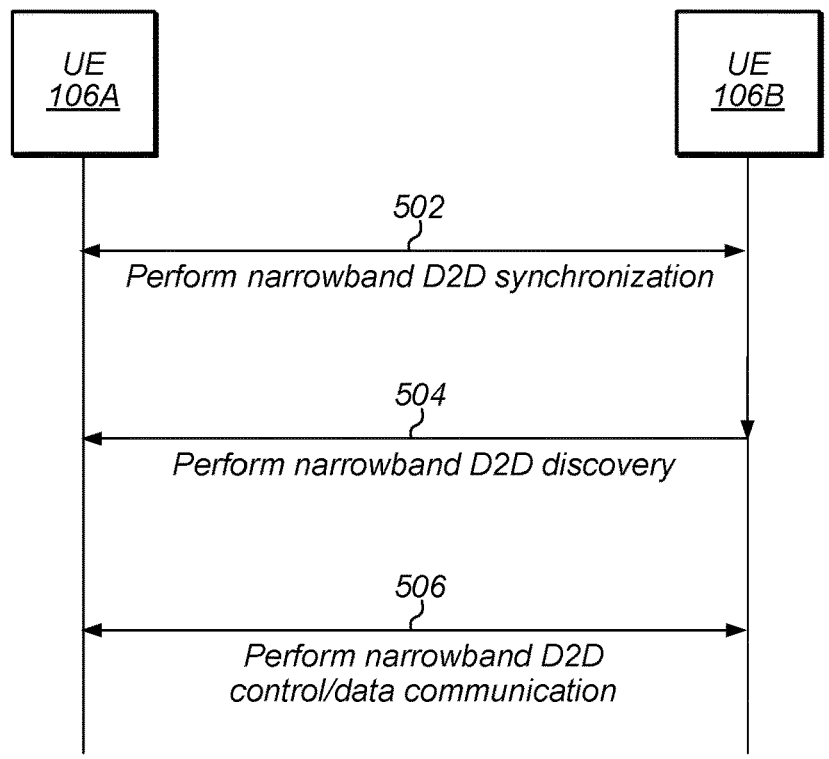
FIG. 5 is a communication flow diagram illustrating an exemplary method for performing narrowband device-to-device wireless communication, according to some embodiments.

FIG. 5—Communication Flow Diagram

FIG. 5 is a communication flow diagram illustrating a method for performing narrowband device-to-device wireless communication, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as the UEs 106A-B or 107 illustrated in and described with respect to FIGS. 1-3, or more generally in conjunction with any of the computer systems or devices shown in the above Figures, among other devices, as desired. Note that while at least some elements of the method of FIG. 5 are described in a manner relating to the use of communication techniques and/or features associated with LTE, OGRS, and/or 3GPP specification documents, such description is not intended to be limiting to the disclosure, and aspects of the method of FIG. 5 may be used in any suitable wireless communication system, as desired. As shown, the method may operate as follows.

In 502, the wireless device may perform device-to-device (D2D) synchronization. The D2D synchronization may be performed on a frequency channel having a frequency width of one physical resource block (PRB), e.g., approximately 200 kHz according to some embodiments. For example, a NB-IoT carrier may be used as the frequency channel, as one possibility. In some instances, multiple such "narrowband" frequency channels may be used to perform the synchronization.

According to some embodiments, the D2D synchronization may be performed while the wireless device is out-of-coverage, e.g, with respect to any cellular base stations (or at least with respect to cellular base stations with which the wireless device is configured to communicate). In such a case, the wireless device may determine that it is OOC, and monitor a sidelink communication band for D2D synchronization signals based on determining that the wireless device is OOC. If the wireless device is unable to decode any synchronization signals while monitoring the sidelink communication band, the wireless device may transmit sidelink synchronization signals itself. If the wireless device is able to receive and decode synchronization signals, the wireless device may synchronize with those signals. Alternatively or additionally, if the wireless device is able to detect synchronization signals (e.g., the wireless device may be part of another D2D communication group), but the detected synchronization signals are too weak (e.g., have signal strength and/or quality below one or more configured thresholds), the wireless device may determine to initiate a new D2D communication group and may provide synchronization signals for that D2D communication group, e.g., based at least in part on determining that the detected synchronization signals are too weak.

According to some embodiments, the synchronization signals may include primary and secondary synchronization signals, which may be referred to variously as sidelink narrowband primary synchronization signals (SNPSS) or direct narroband primary synchronization signals (DNPSS), sidelink narrowband secondary synchronization signals (SNSSS), direct narrowband secondary synchronization signal (DNSSS), and/or in any of various other manners. The synchronization signals may further include a D2D master information block (MIB), which may be transmitted on a sidelink narrowband physical broadcast channel (SNPBCH). Alternatively, the MIB may be considered separate from the synchronization signals, according to some embodiments. The SNPSS, SNSSS, and SNPBCH may be collocated with respect to frequency channel (e.g., may be transmitted in the same 1PRB frequency channel or same set of narrowband frequency channels). The D2D MIB may indicate which portions of the frequency channel are allocated for any or all of D2D synchronization signals, D2D discovery messages, D2D control communications, and/or D2D data communications. Alternatively (or additionally), at least some of these allocations may be indicated in discovery messages.

In 504, the wireless device may perform D2D discovery with a second wireless device. The D2D discovery may be performed using a sidelink narrowband physical discovery channel (SNPDCH) or other discovery channel allocated within a frequency channel comprising a frequency width of one PRB, or may be performed using multiple such narrowband frequency channels, according to some embodiments.

In 506, the wireless device may perform D2D communication, e.g., including control and/or data communications, with the second wireless device. The control communication may be performed using a sidelink narrowband physical control channel (SNPCCH) and the data communication may be performed using a sidelink narrowband physical shared channel (SNPSCH), according to some embodiments. The control and/or data communications may be performed in a different (but also narrowband, e.g., 1PRB) frequency channel or set of frequency channels than the synchronization and/or discovery communications, if desired, or may be performed in the same frequency channel or set of frequency channels as the synchronization and/or discovery communications. For example, two or more frequency channels each comprising a frequency width of one PRB may be aggregated to perform the D2D discovery and communication, such that a first frequency channel is used for D2D discovery, and a second frequency channel is used for D2D control and data communications, as one possibility.

Note also that, if desired, a frequency hopping scheme may be employed with respect to the narrowband D2D communication. For example, the wireless device may periodically hop to a different frequency channel (e.g., also comprising a frequency width of one PRB) to perform the D2D synchronization, discovery, and/or communication according to a predetermined frequency hopping pattern. Thus, D2D synchronization/MIB signals could be provided on each respective frequency channel of a set of frequency channels during a respective portion of a D2D synchronization signal cycle in a sequential manner, as one possibility. Other wireless devices following the same synchronization scheme may also follow the same frequency hopping pattern. At least according to some embodiments, frequency hopping for sychronization and MIB transmission may be performed according to a scheme configured such that the average amount of time that a wireless device transmits on any given frequency channel is below a desired value (e.g., below a duty cycling parameter), according to some embodiments. For example, the periodicity at which the D2D synchronization signals and the D2D MIB are provided on each respective frequency channel during the respective portion of the D2D synchronization signal cycle and a number of frequency channels used could be determined such that an average transmission time on each frequency channel is below a transmit duty cycle threshold.

If a frequency hopping pattern is used, the specific pattern used may be determined in any of various ways. As one possibility, a cell ID may be selected for each D2D communication group that is established, and there may be a predetermined mapping between a cell ID and a frequency hopping pattern, e.g., such that wireless devices may be able to determine the frequency hopping pattern in use by a D2D communication group based at least in part on the cell ID for the group. If desired, the cell ID may also or alternatively be used to determine other parameters used by a D2D communication group, such as at which subframe number(s) certain types of information (e.g., a MIB) is transmitted.

In some instances, a frequency hopping pattern may be selected to include a set of frequency channels that are adjacent in bandwidth. If so, it may be possible for a receive to capture samples for the entire adjacent set of channels in use, apply a frequency shift to each channel, and perform downsampling to obtain a signal corresponding to each channels. Thus, a wireless device may, in such a manner, be able to more quickly detect D2D signals (e.g., D2D synchronization signals) on each of the frequency channels in use by a D2D communication group.

Note still further that, if desired, listen-before-talk (LBT) techniques may be employed with respect to the narrowband D2D communication. For example, the wireless device may perform a LBT procedure prior to transmitting D2D discovery, control, and/or data messages, according to some embodiments. At least in some instances, it may be the case that no LBT procedure is performed prior to transmitting D2D synchronization signals, e.g., even if LBT procedures are performed prior to transmitting D2D discovery, control, or data messages.

FIGS. 6-21 and Additional Information

FIGS. 6-21 and the following additional information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Figure 6:
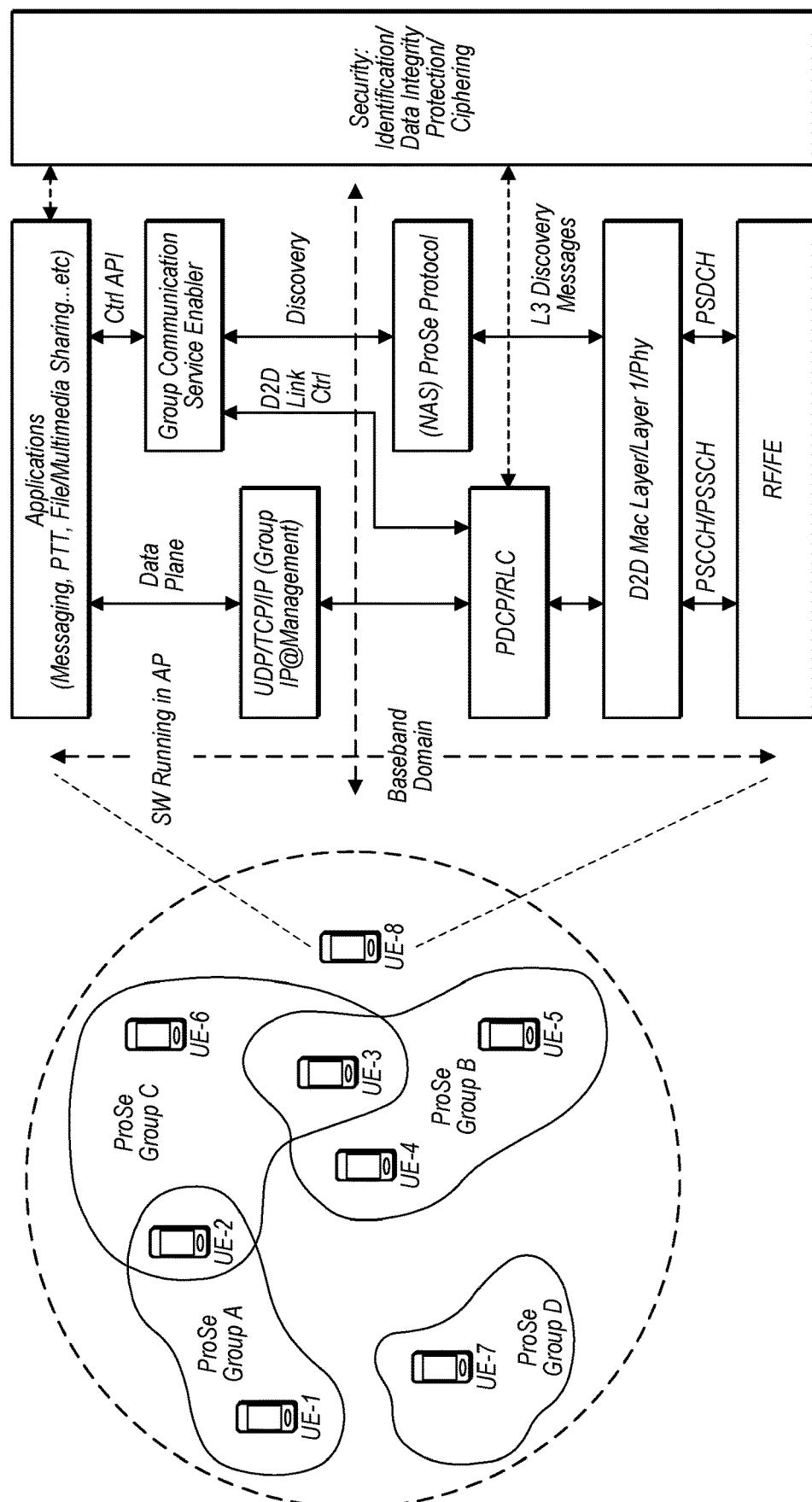
FIG. 6 illustrates aspects of an exemplary cellular network supported device-to-device communication architechture, according to some embodiments.

FIG. 6 illustrates aspects of an exemplary cellular network supported device-to-device communication architechture, according to some embodiments. In particular, an end-to-end architecture for 3GPP "ProSe" (proximity services) direct link communication is shown, in which various UEs form ProSe groups. Each UE participating in such ProSe communication may implement a ProSe stack, including applications and user datagram protocol (UDP)/transport control protocol (TCP)/internet protocol (IP) layers in software executing on an application processor, along with a group communication service enabler. The ProSe stack may also include a packet data convergence protocol (PDCP)/radio link control (RLC) layer, a non-access stratum (NAS) ProSe protocol layer, a D2D media access control (MAC/layer 1/physical (PHY) layer, as well as a RF front end, implemented in the baseband domain. The ProSe stack may also include a security layer for identification/data integrity protection/ciphering.

Figure 7:
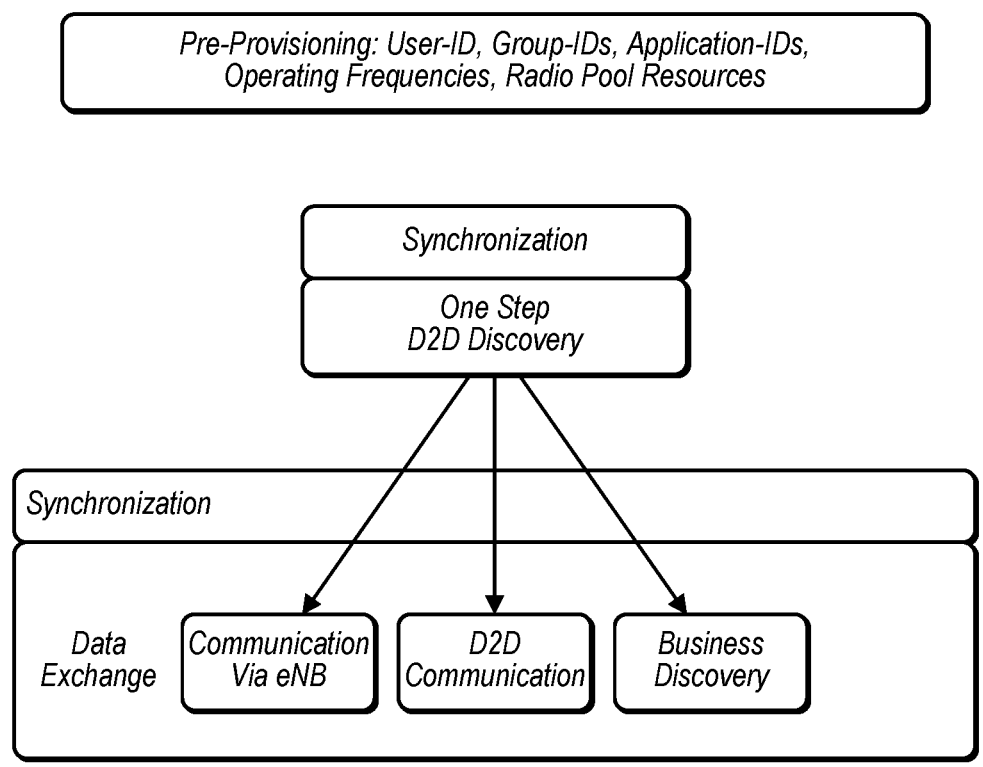
FIG. 7 illustrates various possible device-to-device communication related operations in an exemplary cellular network supported device-to-device communication framework, according to some embodiments.

FIG. 7 illustrates various possible device-to-device communication related operations in an exemplary cellular network supported device-to-device communication framework, according to some embodiments. As shown, one such operation may include pre-provisioning, e.g., in which a UE device is provided (e.g., by a cellular network to which it is subscribed) with user identification information, group identification information, application identification information, D2D operating frequency information, radio pool resources, etc. Once pre-provisioned, a UE may perform synchronization and D2D discovery. Once discovery is complete, data exchange synchronization may further occur, as well as actual data exchange, which may include any combination of communication by way of a base station (e.g., an eNB), D2D communication, or business discovery.

Figure 8:
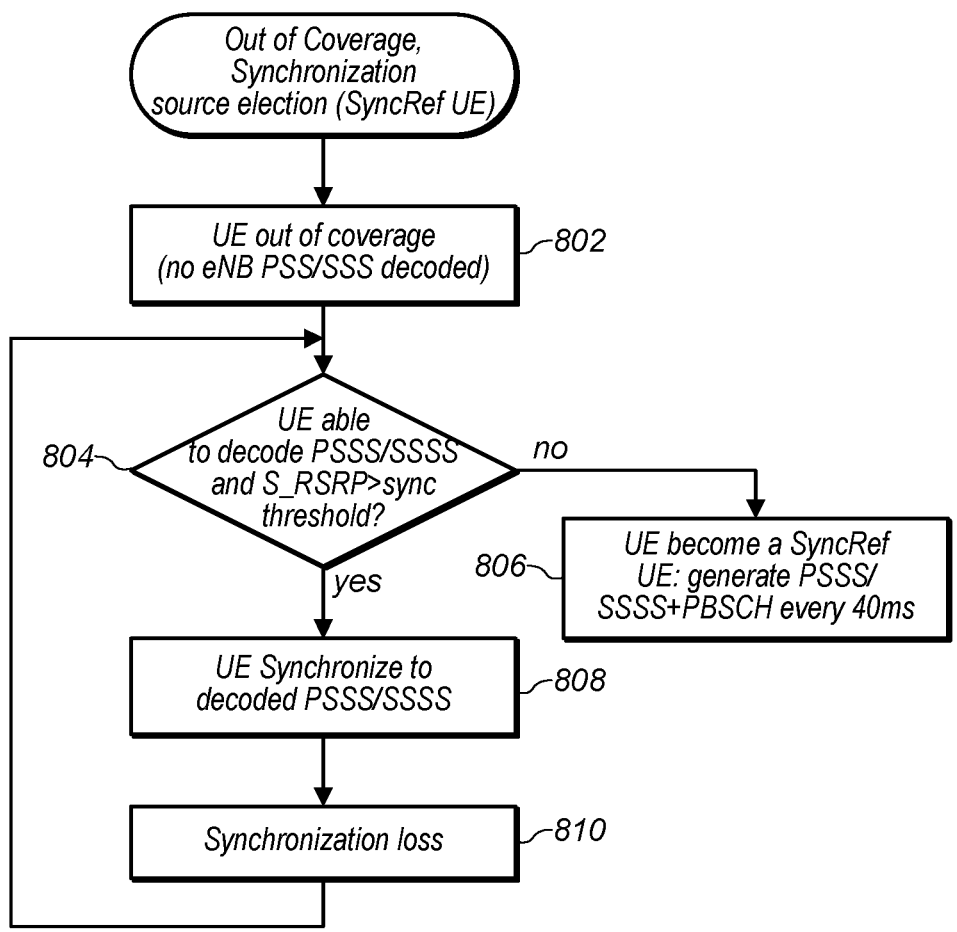
FIG. 8 is a flowchart diagram illustrating an exemplary possible decisionmaking process for determining how to perform synchronization for device-to-device communications when out-of-coverage in an exemplary cellular network supported device-to-device communication framework, according to some embodiments.

When a UE device is within coverage range of a cellular network in a cellular network supported device-to-device communication framework, synchronization for the UE device may be derived from downlink primary synchronization signals (PSS) and secondary synchronization signals (SSS) transmitted by a cellular base station. Outside network coverage areas, primary/secondary sidelink synchronization signals (PSSS/SSSS) and a sidelink master information block (MIB_SL) may be transmitted by UEs to provide synchronization signals between D2D devices and to avoid interference. In order to avoid multiple synchronization sources, a process may be defined to elect a single UE (a "SyncRef UE") within a given area to act as a synchronization source. FIG. 8 is a flowchart diagram illustrating such an exemplary possible decisionmaking process for determining how to perform synchronization for device-to-device communications when out-of-coverage in an exemplary cellular network supported device-to-device communication framework, according to some embodiments.

As shown, in 802, initially the UE device may determine that it is out of coverage (e.g., that no eNB PSS/SSS is decoded).

Having determined that the UE device is out of coverage, in 804, the UE may determine whether it is able to decode any PSSS/SSSS with signal strength above a certain threshold (e.g., S_RSRP>sync threshold?).

If the UE is unable to decode any PSSS/SSSS with sufficient signal strength, the UE may transition to 806, becoming a SyncRef UE and generating and transmitting PSSS/SSSS and physical sidelink broadcast channel (PSBCH) information (e.g., the MIB_SL) according to a specified periodicity (e.g., every 40 ms, as one possibility).

If the UE is able to decode PSSS/SSSS with sufficient signal strength, the UE may transition to 808, syncronizing to the decoded PSSS/SSSS. Eventually, in 810, the UE may lose synchronization to these PSSS/SSSS, and the UE may return to step 804 to again determine whether another SyncRef UE is available or whether the UE will become a SyncRef UE.

Figure 9:
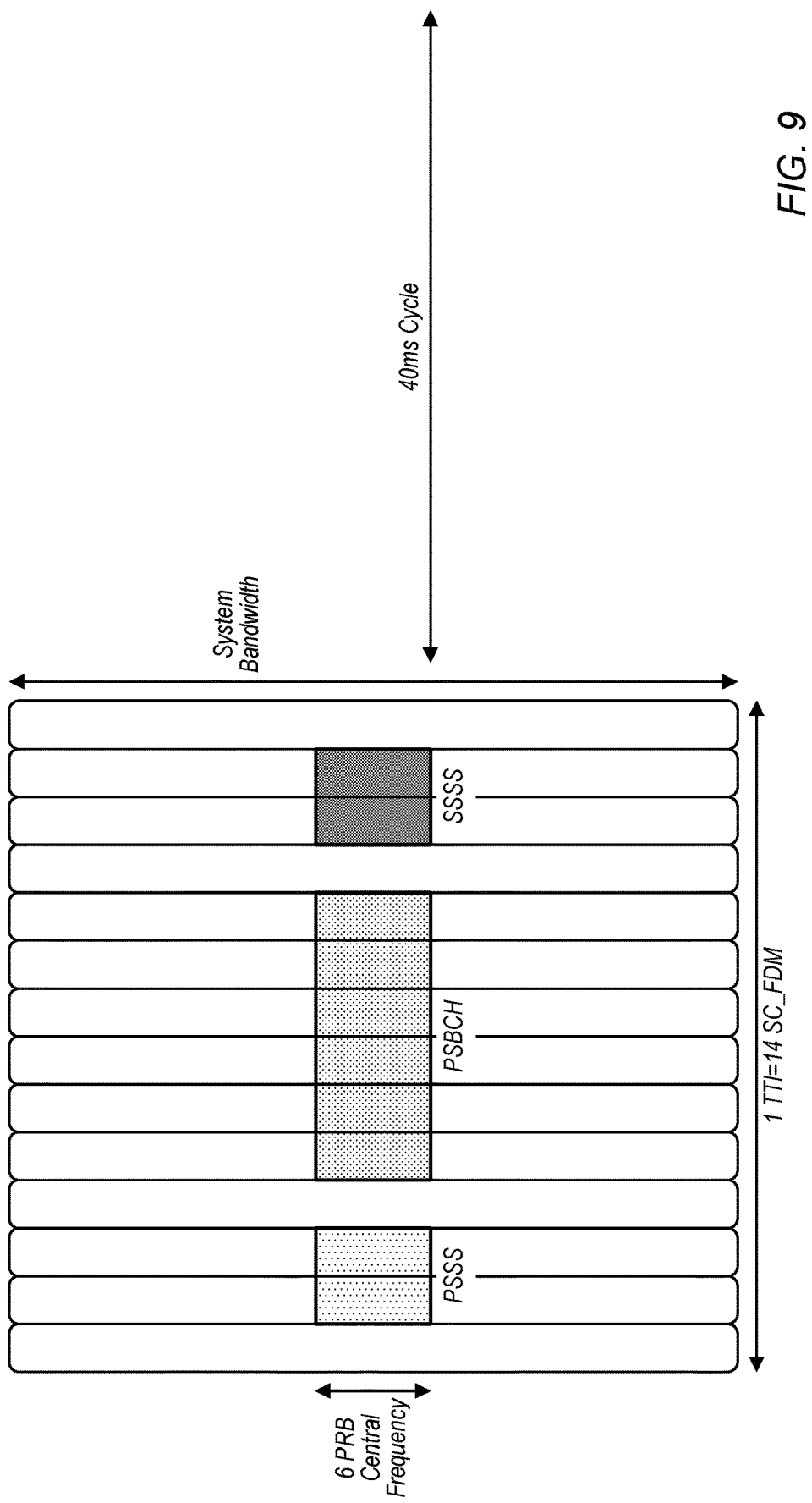
FIG. 9 illustrates exemplary possible synchronization and transmission occasions and locations in time and frequency in an exemplary cellular network supported device-to-device communication framework, according to some embodiments.

FIG. 9 illustrates exemplary possible synchronization and transmission occasions and locations in time and frequency in an exemplary cellular network supported device-to-device communication framework, according to some embodiments. As shown, the synchronization signals may generally be transmitted in the central 6 PRBs of a system bandwidth that may (e.g., typically) be larger than 6 PRBs. The PSSS, PSBCH, and SSSS may be transmitted on a 40 ms cycle, and when transmitted the PSSS may be located in the 2nd and 3rd symbols of a subframe (e.g., a 1 ms transmission time interval (TTI)), the PSBCH may be located in the 5th through 10th symbols of a subframe, and the SSSS may be located in the 12th and 13th symbols of a subframe.

Figure 10:
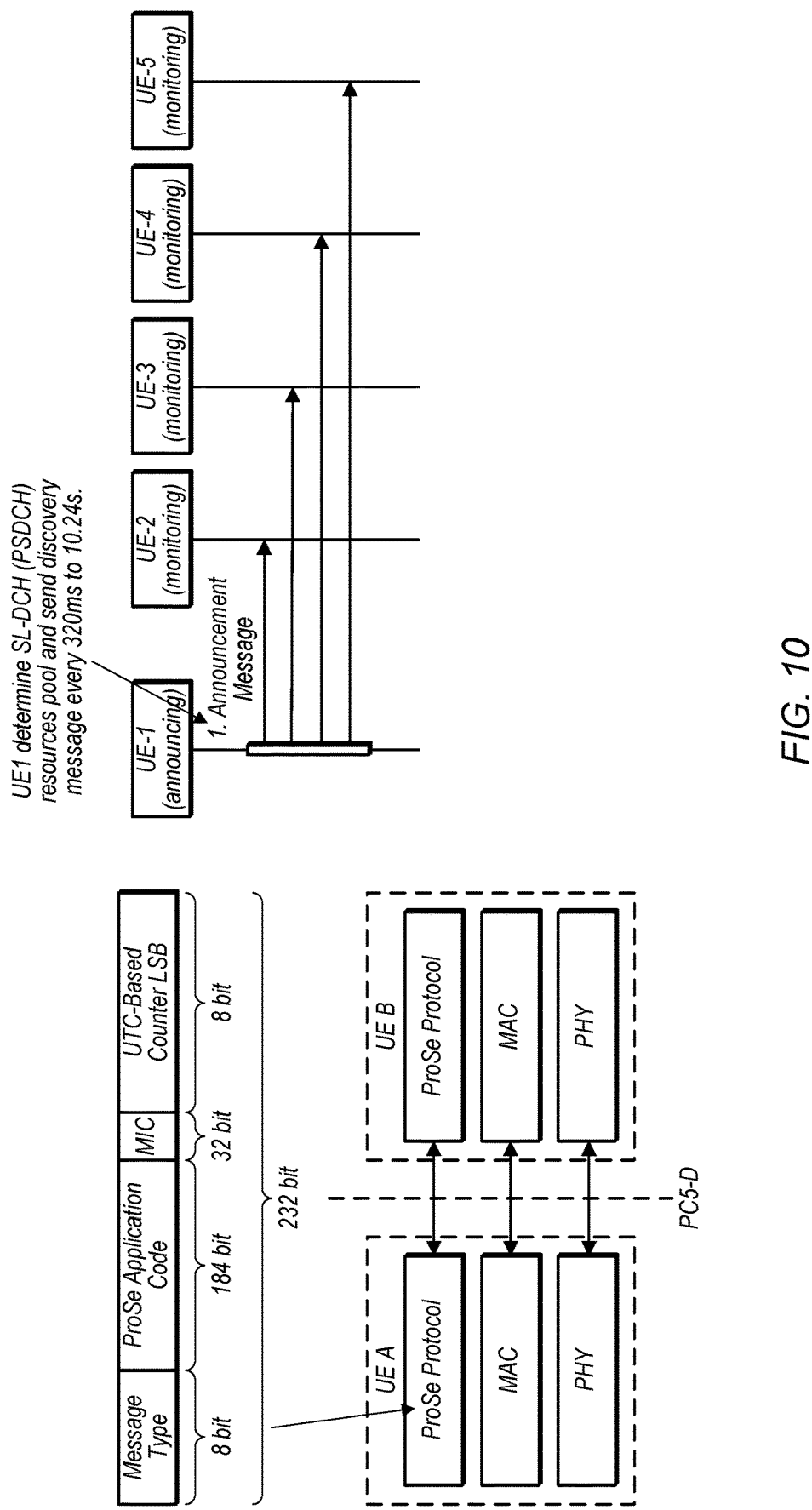
FIG. 10 illustrates exemplary possible aspects of a device discovery process in an exemplary cellular network supported device-to-device communication framework, according to some embodiments.

FIG. 10 illustrates exemplary possible aspects of a device discovery process in an exemplary cellular network supported device-to-device communication framework, according to some embodiments.

As shown, a UE wishing to perform D2D discovery may generate a discovery message, which may include fields for message type (e.g., open or restricted discovery, discovery model, etc.), ProSe application code, message integrity check (MIC), and the least significant bit(s) (LSB) of a universal time coordinated (UTC) based counter at a ProSe protocol layer. Such a discovery message may be sent over the MAC layer directly, at least in some instances.

As further shown, a UE performing D2D discovery may transmit an announcement message. Note that synchronization may occur prior to transmitting an announcement message, e.g., such that the UE may either be the SyncRef UE or may be synchronized with the SyncRef UE of the area. From the synchronization information (e.g., the MIB_SL), the UE wishing to transmit an announcement message may determine the sidelink discovery channel (SL-DCH) resources pool (e.g., the resources assigned for the PSDCH) and send a discovery message every 320 ms to 10.24 seconds. Other UEs in the vicinity may monitor PSDCH RBs in the preconfigured occasions and locations to discover other UEs, potentially including advertised application identifiers for those discovered UEs.

Figure 11:
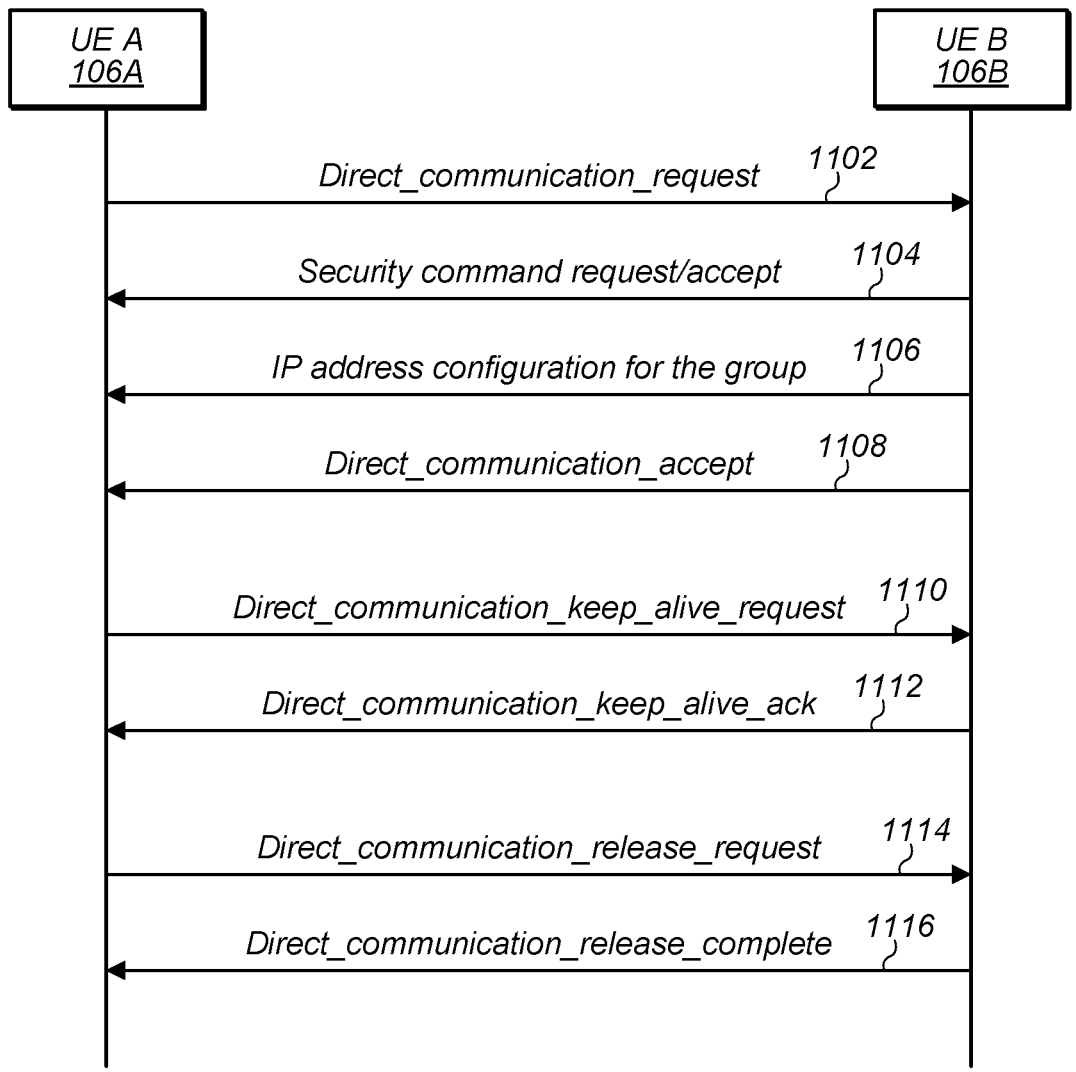
FIG. 11 is a communication flow diagram illustrating an exemplary possible message flow between wireless devices performing device-to-device wireless communication, according to some embodiments.

FIG. 11 is a communication flow diagram illustrating an exemplary possible message flow between wireless devices performing device-to-device wireless communication, according to some embodiments. The illustrated communication flow may occur, for example, once "UE A" and "UE B" are time and frame synchronized, have shared MIB information, and have discovered that they are in range (e.g., layer 2 IDs may have been exchanged in the discovery procedure).

UE A and UE B may further start by generating PC5 signaling (NAS messages) for: D2D link setup, authentication, keep alive, and releases.

In 1102, UE A may transmit a direct communication request message to UE B.

In 1104, UE A and UE B may exchange security command request/accept messages.

In 1106, IP address configuration for the group may be performed.

In 1108, the UE B may transmit a direct communication accept message to UE A.

In 1110, UE A may transmit a direct communication keep alive request message to UE B.

In 1112, UE B may transmit a direct communication keep alive acknowledgement message to UE A.

In 1114, UE A may transmit a direct communication release request message to UE B.

In 1116, UE B may transmit a direct communication release complete message to UE A.

Similar to the physical downlink control channel (PDCCH) and physical downlink shared channel (PDSCH) in LTE, D2D communication may include two physical channels for sideline control and data communications. These may include the physical sideline control channel (PSCCH), which may carry sideline control information (SCI), which may be functionally similar to 3GPP downlink control information (DCI) but for sideline communication, and the physical sideline shared channel (PSSCH), which may carry sideline data itself.

UEs that are out-of-coverage may use the mode 2 (autonomous) of PSCCH resource allocation. PSCCH pools and time may be pre-configured in the UE (PSCCH resources may be repeated every sidelink communication (SC) period, e.g., 40 to 320 ms. When the MAC layer decides to transmit a communication message, it may randomly select resources within the PSCCH to transmit SCI 0. The SCI 0 may provide information for the receiver to decode the PSSCH data, such as a group destination identifier (e.g., the 8 LSB of the Layer-2 UE ID or Layer 2 Group ID, serving as a RNTI for the UE; all UEs in communication may be expected to decode all SCI pools every SC period), a modulation and coding scheme (MCS), a resource block assignment (e.g., the frequency location of the PSSCH data RBs), and/or a time resource pattern (e.g., a time domain bitmap).

Figure 12:
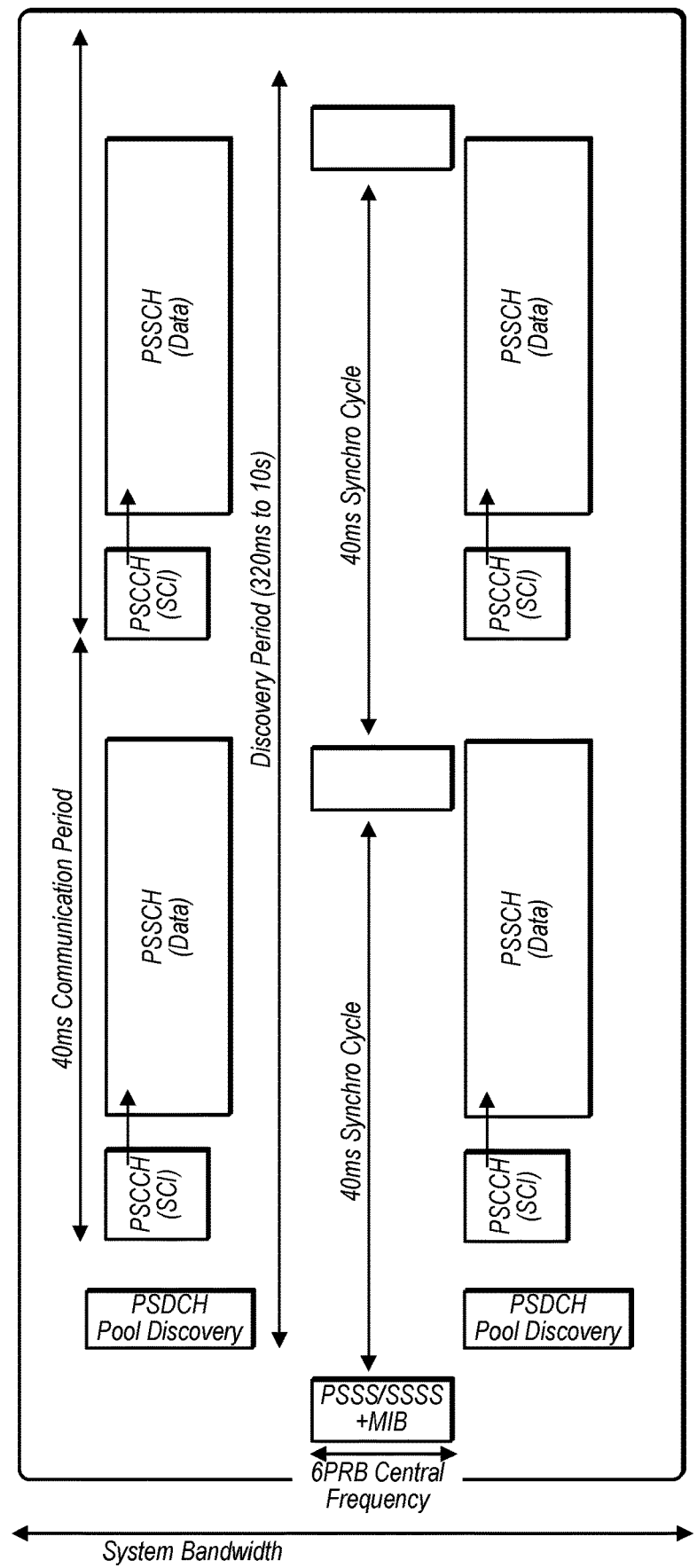
FIG. 12 illustrates an exemplary possible radio resources mapping in an exemplary cellular network supported device-to-device communication framework.
Figure 13:
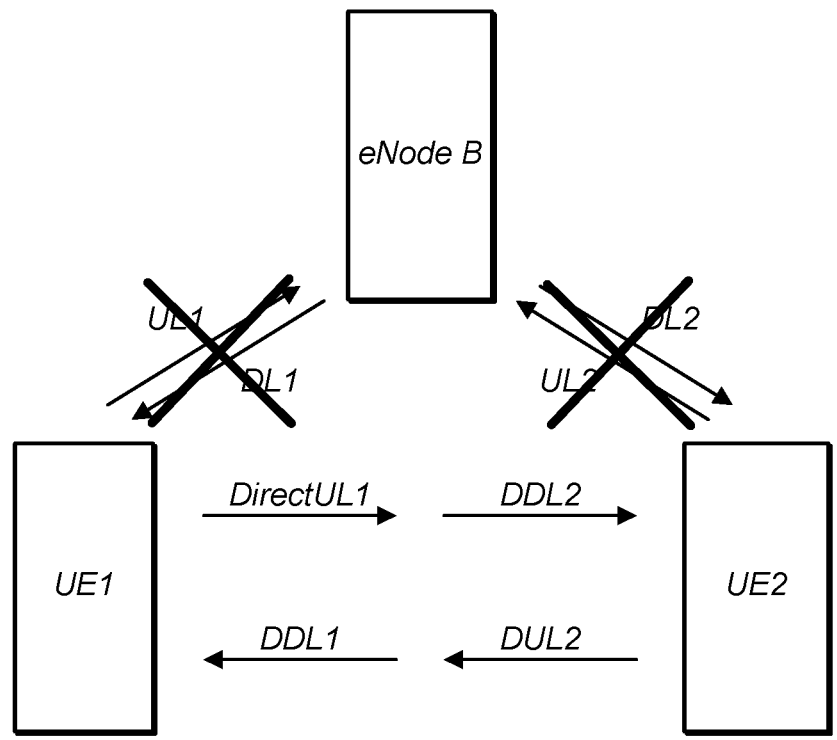
FIG. 13 illustrates an exemplary possible scenario in which cellular network support is unavailable while wireless devices are performing device-to-device wireless communication, according to some embodiments.

FIG. 12 illustrates an exemplary possible radio resources mapping in an exemplary cellular network supported device-to-device communication framework. In the illustrated example scenario, in addition to the synchronization signals transmitted in the central 6 RBs of the system bandwidth, discovery pool resources, sidelink control channel allocations, and sidelink shared channel allocations may be located in various other (e.g., outer) RBs of the system bandwidth over time. Thus, the sidelink communication performed according to the scenario of FIG. 12, and existing D2D protocols designed for discovery and communication in accordance with 3GPP, may encompass relatively wideband operation, e.g., encompassing at least 6 RBs (e.g., 1.4 MHz) and potentially up to 100 RBs (e.g., 20 MHz).

In at least some instances, however, a more narrowband deployment may be advantageous. For example, for the transmit power regimes of many devices, propagation characteristics for narrowband communications may result in greater range capacity than wider-band communications. Note that effective communication range may be further increased, at least in some instances, if a lower-frequency communication band (e.g., 900 MHz unlicensed spectrum, as one possibility) is used for the narrowband D2D communications. As another possibility, some (e.g., lower complexity) devices may be configured to perform only narrowband communications (e.g., may have RF front end limitations, and/or may have battery limitations functionally limiting their capability to perform wider-band communications). As yet another possibility, some devices, even if capable of both wideband and narrowband communication, may prefer to perform narrowband communication when possible, e.g., if the narrowband communication can reduce power consumption by the devices.

Accordingly, D2D protocol and physical layer specifications for supporting narrowband (e.g., 200 kHz/1 RB) D2D communciations are described herein, at least according to some embodiments. The techniques described herein may be used in scenarios when one or more of the communicating wireless devices are not within communication range of a cellular base station (e.g., the devices may be OOC), such as in the scenario illustrated in FIG. 13, according to some embodiments.

Figure 14:
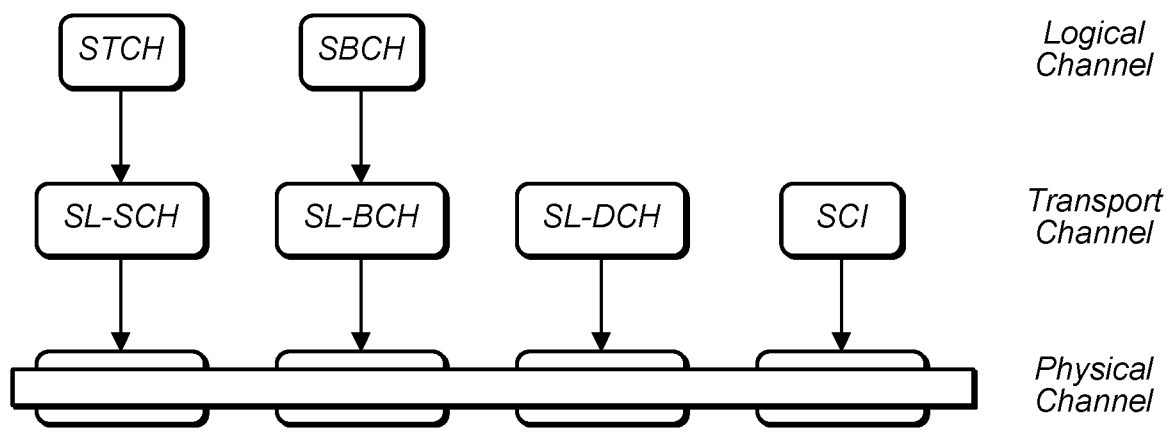
FIG. 14 illustrates aspects of an exemplary possible logical, transport, and physical channel mapping for narrowband device-to-device wireless communication, according to some embodiments.

While many elements of narrowband D2D communication may differ from the relatively wider-band D2D communication currently supported by 3GPP, it may be possible to reuse certain existing D2D mechanisms. For example, as illustrated in FIG. 14, it may be possible to reuse the D2D basic mechanisms at layer 3 and layer 2 (e.g., NAS signaling and logical channels). As also illustrated, the physical channels may be replaced with physical channels that can operate in the envisioned narrow bandwidth.

Figure 15:
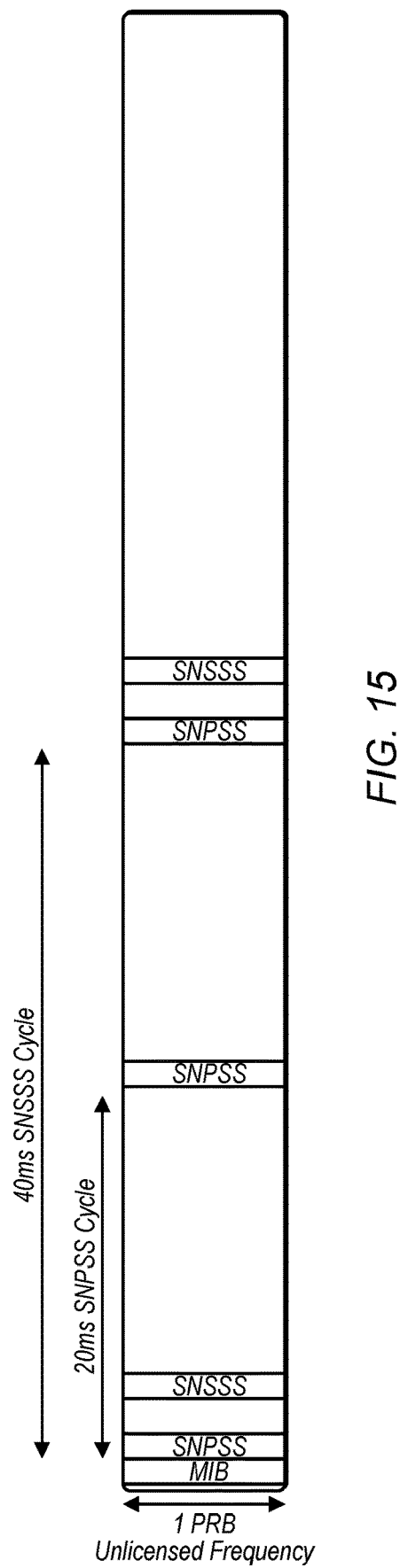
FIG. 15 illustrates aspects of an exemplary possible narrowband device-to-device communication timeline including synchronization portions of the narrowband device-to-device communication, according to some embodiments.

FIG. 15 illustrates aspects of an exemplary possible narrowband device-to-device communication timeline including synchronization portions of the narrowband device-to-device communication, according to some embodiments. The synchronization signals may include a sidelink narrowband primary synchronization signal (SNPSS), which may provide for time synchronization between UEs in the same area. According to some embodiments, the SNPSS may include a synchronization sequence that fits into one PRB, and may include a Zadoff-Chu sequence of length 11. The SNPSS may fill out the last 11 OFDM symbols of subframe #5 and may be transmitted every 20 ms.

The synchronization signals may further include a sidelink narrowband secondary synchronization signal (SNSSS). According to some embodiments, the SNSSS may also include a synchronization sequence that fits into one PRB. The SNSSS may fill out the last 11 OFDM symbols of subframe #9 and may be transmitted every 40 ms. Combining the SNPSS and SNSSS may provide the narrowband sidelink ID.

Additionally, a sidelink narrowband physical broadcast channel (SNPBCH) may be provided. The SNPBCH may fill out the last 11 OFDM symbols of subframe #0, and may be transmitted every 640 ms (possibly with a repetition of 8 times over 80 ms). The SNPBCH may carry the D2D MIB and provide UEs with information regarding narrow band frequencies, frame and subframe number, frame pattern for discovery, and hopping patterns for D2D communication.

Figure 16:
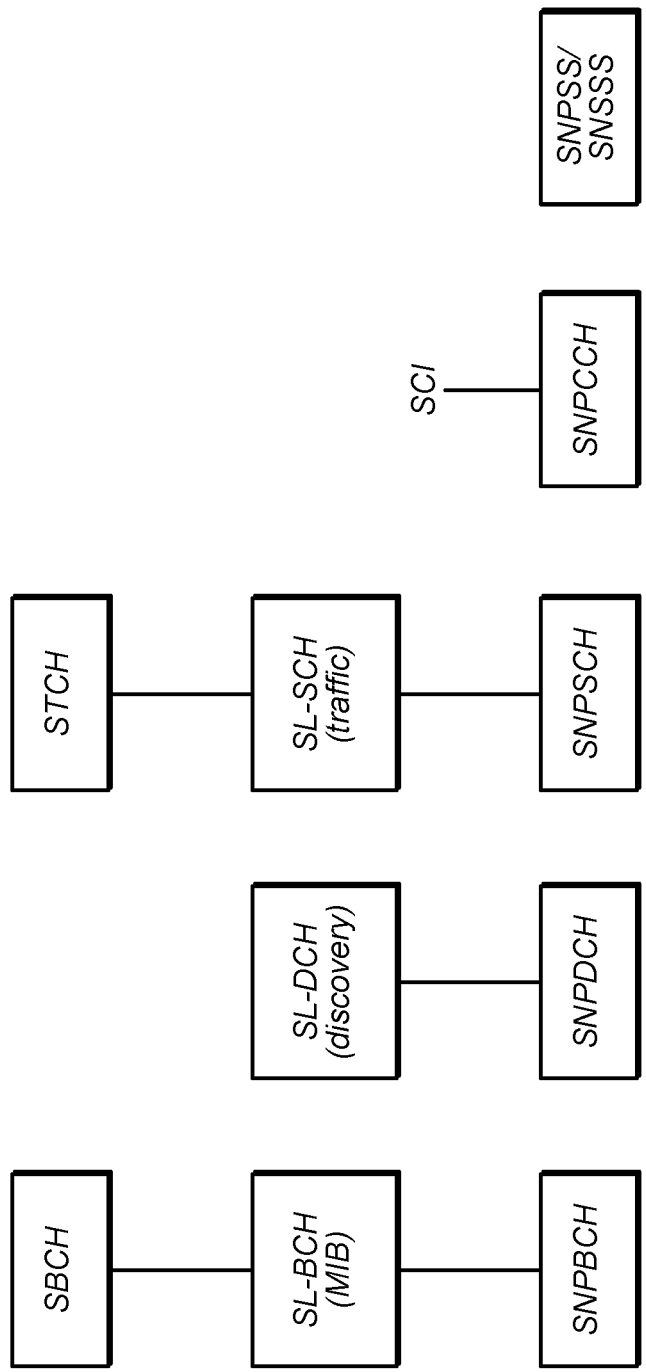
FIG. 16 illustrates further aspects of an exemplary possible logical, transport, and physical channel mapping for narrowband device-to-device wireless communication, according to some embodiments.

FIG. 16 illustrates further aspects of an exemplary possible logical, transport, and physical channel mapping for narrowband device-to-device wireless communication, according to some embodiments. In particular, in addition to the layer 3 and layer 2 transport and logical channels previously illustrated in FIG. 14, physical channels are illustrated that are capable of supporting the synchronization signals illustrated in and described with respect to FIG. 15, as well as discovery, control, and data communications. For example, the SL-BCH may be mapped to the SNPBCH and may be used to communicate the D2D MIB; the SL-DCH may be mapped to the sidelink physical discovery channel (SNPDCH) and may be used to communicate discovery messages/announcements; the SL-SCH may be mapped to the sidelink physical shared channel (SNPSCH) and may be used to communicate data; sidelink control information may be communicated on the sidelink physical control channel (SNPCCH); and SNPSS/SNSSS may also be communicated at the physical layer. Note that at least as one possibility, all of the illustrated physical channels may be mapped to uplink NB-IoT channels having 1 PRB bandwidth. According to some embodiments, any of 15 kHz and 3.75 kHz support and/or binary phase shift keying (BPSK), quadrature phase shift keying (QPSK), and 16-quadrature amplitude modulation (QAM) support may be provided.

Figure 17:
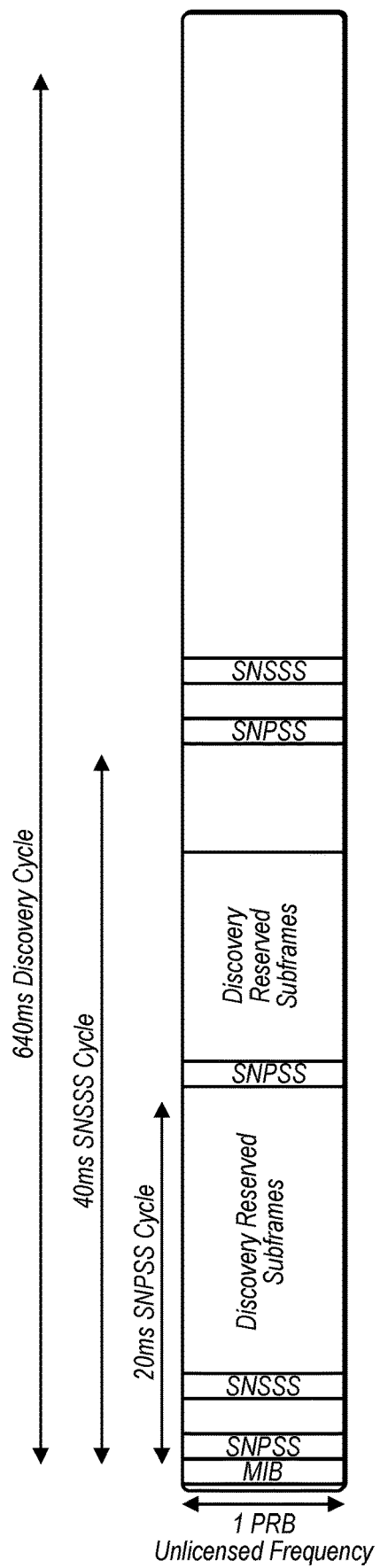
FIG. 17 illustrates aspects of an exemplary possible narrowband device-to-device communication timeline further including discovery portions of the narrowband device-to-device communication, according to some embodiments.

According to some embodiments, a similar higher layer procedure of D2D discovery as used for wider-band deployments may also be used for NB D2D discovery, for example in accordance with the discovery features illustrated in and described with respect to FIG. 10. The MAC layer may map the existing SL-DCH channel to a new SNPDCH. The NAS discovery message size and field may be reduced to fit in 1 RB (e.g., instead of 2 RB in at least some LTE D2D specification versions). The SNPDCH may be allocated in the main channel and collocated with the SNPSS, SNSSS, and D2D MIB. The SNPDCH may span a certain amount of subframes, and UEs may use random transmit locations and probabilities to send discovery packets with predefined discovery resources. The period between two discovery messages may be 640 ms, according to some embodiments. FIG. 17 illustrates aspects of an exemplary possible narrowband device-to-device communication timeline including such discovery portions of the narrowband device-to-device communication in addition to synchronization signal portions, according to some embodiments.

As previously noted, narrowband D2D control and data communications may be performed on two new physical channels, the SNPCCH and SNPSCH. The SNPCCH may carry sideline narrowband control information (SNCI), while the SNPSCH may carry the data itself. The SNPSCH and SNPCCH could be in the same narrowband channel as the synchronization channels or in a secondary frequency channel. The location of the secondary communication channel (e.g., if applicable) could be shared in the MIB or in the discovery procedure. The SNPSCH reserved subframes could be pre-configured or could be dynamically determined and shared through the MIB. Within the SNPSCH multi tones and single tone allocations could be used. When the MAC layer decides to transmit a communication message, it may select the appropriate communication channel and randomly select a subframe from the SNPSCH frame SNCI. At least according to some embodiments, the secondary communication channel (if applicable) control and data occasions may not overlap with primary channel SNPSS occasions, e.g., in order to allow time synchronization. The SNCI may provide the necessary information for the receiver to decode the SNPSCH data, such as modulation and coding scheme (MCS) information, redundancy version (RV) information, subframe numbers (e.g., start/end), multi tone or single tone, and the tone numbers. Data could also be repeated in time, if desired.

Figure 18:
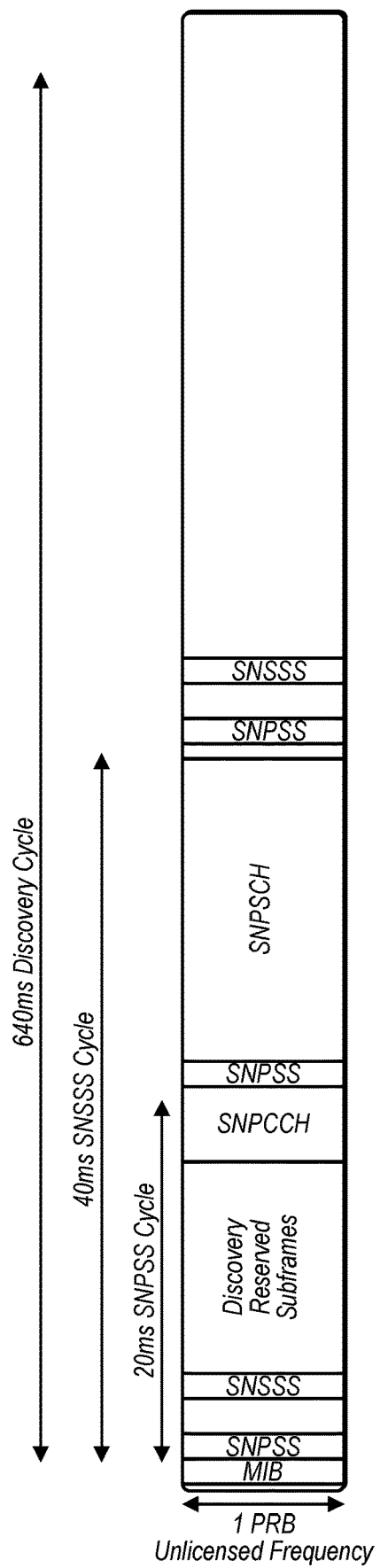
FIG. 18 illustrates aspects of an exemplary possible narrowband device-to-device communication timeline further including control and data portions of the narrowband device-to-device communication, according to some embodiments.

FIG. 18 illustrates aspects of an exemplary possible narrowband device-to-device communication timeline including such control/data communication portions of the narrowband device-to-device communication in addition to discovery and synchronization signal portions, according to some embodiments. Note that the example of FIG. 18 may be representative of a deployment scenario in which aggregation (e.g., use of both a primary communication channel and a secondary communication channel) is not used, e.g., such that synchronization, discovery, control, and data communications are all performed on the same 1PRB frequency channel.

Figure 19:
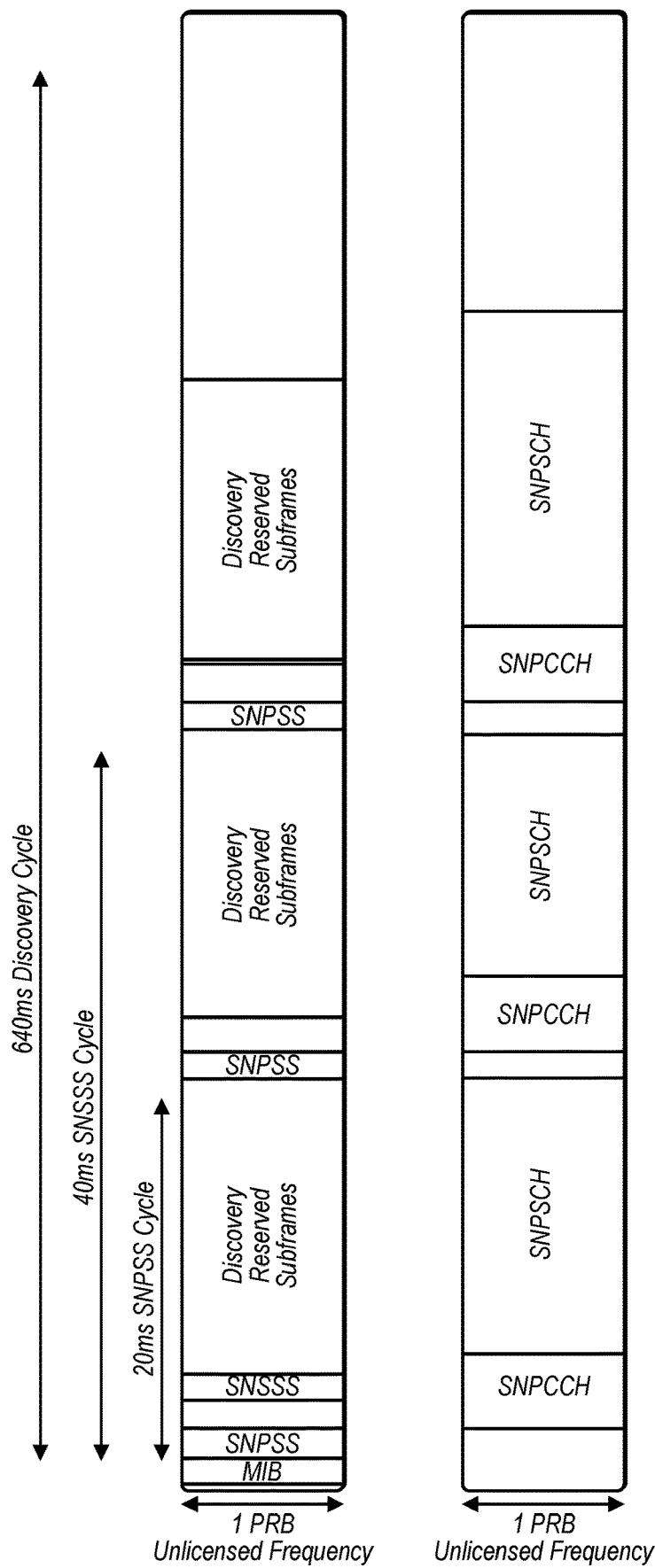
FIG. 19 illustrates aspects of an exemplary possible narrowband device-to-device communication timeline that utilizes aggregation, according to some embodiments.

FIG. 19 illustrates aspects of an exemplary possible narrowband device-to-device communication timeline that does utilize aggregation, according to some embodiments. As shown, synchronization and discovery communications may occur on a primary communication channel (e.g., a first 1PRB frequency channel), while control and data communications may occur on a secondary communication channel (e.g., a second 1PRB frequency channel).

Figure 20:
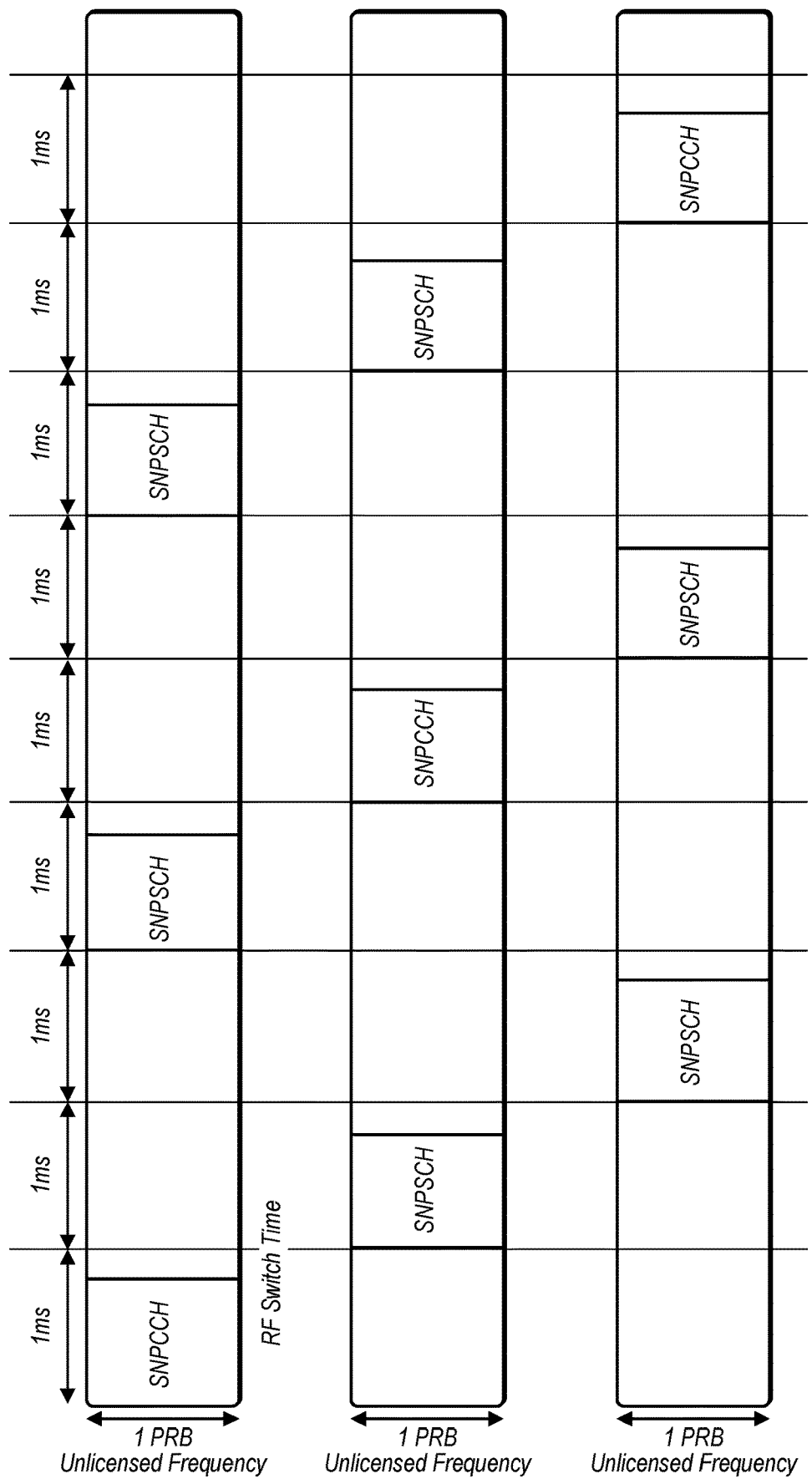
FIG. 20 illustrates aspects of an exemplary possible narrowband device-to-device communication timeline that utilizes frequency hopping, according to some embodiments.

If desired, frequency hopping may also be supported for narrowband D2D communication. Frequency hopping may improve the robustness of the narrowband communication, e.g., mitigating at least in part the potential vulnerability of such communication to fades and other interference phenomena. FIG. 20 illustrates aspects of such an exemplary possible narrowband device-to-device communication timeline that utilizes frequency hopping, according to some embodiments. According to the illustrated scenario, UEs in an area may hop every millisecond according to a predetermined hopping pattern, which may be provided by way of the MIB or SNPSS. For discovery and synchronization, and for at least 25 ms to ensure that it is not missing a SNPSS, if a SNPSS is found, a UE may move to the next hop, e.g., in order to detect the SNSSS and SN-MIBs. The data channel (e.g., if supported as a separate channel) may follow the same hopping sequence as the synchronization and discovery channel. According to some embodiments, when frequency hopping is implemented, the last OFDM symbol or the first OFDM symbol of each subframe may not be used to transmit data (e.g., in order to provide time for RF to hop to the new frequency).

Figure 21:
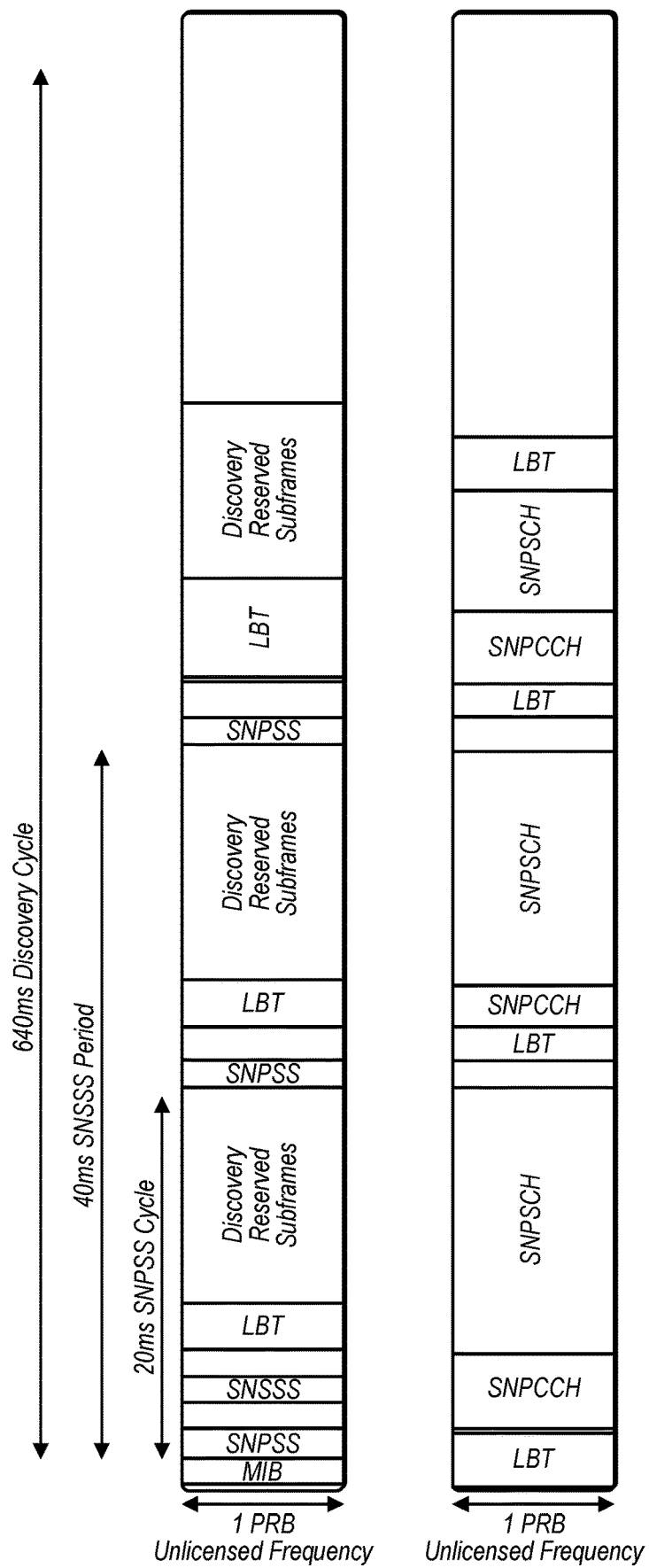
FIG. 21 illustrates aspects of an exemplary possible narrowband device-to-device communication timeline that utilizes listen-before-talk techniques, according to some embodiments.

Further, at least according to some embodiments, a listen-before-talk (LBT) procedure may be used in conjunction with narrowband D2D communication. For example, in some areas regulations may require that LBT procedures be used when operating in unlicensed spectrum. FIG. 21 illustrates aspects of an exemplary possible narrowband device-to-device communication timeline that utilizes listen-before-talk techniques, according to some embodiments. As one possibility, each UE may perform a fixed LBT of 25 μs before transmission of discovery or data messages. According to some embodiments, it may be acceptable not to perform LBT for SNPSS and SNSSS/MIB transmissions, e.g., because of the short length of such communications.

The transmission may be done in subframe boundaries and for a certain transmit opportunity (TXOP) duration.

FIGS. 22-26 and Additional Information—Off Grid Radio Service

Off Grid Radio Service (OGRS) is a system that is being developed to provide long range peer-to-peer (P2P)/D2D communication, e.g., in absence of a wide area network (WAN) or WLAN radio connection to support a variety of possible features. At least according to some embodiments, OGRS systems may support some or all of the features previously described herein, such as any of the features or steps of the method of FIG. 5. FIGS. 22-26 and the following additional information are provided as being illustrative of a variety of further possible features and details of a possible OGRS communication system, and are not intended to be limiting to the disclosure as a whole. Numerous variations and alternatives to the details provided herein below are possible and should be considered within the scope of the disclosure.

According to some embodiments, OGRS may operate in unlicensed low ISM bands, e.g., between 700 MHz and 1 GHz, for extended range purposes, and may use one or multiple carriers of approximately 200 kHz. OGRS may be designed to meet the local spectrum regulatory requirements, such as channel duty cycle, operating frequencies, hopping pattern, LBT, maximum transmit power, and occupied bandwidth.

Any of a variety of features may be included in an OGRS system, including when operating in regulated unlicensed spectrum, such as 900 MHz unlicensed spectrum. For example, frequency hopping spread spectrum (FHSS) may be used. Channel carrier frequencies may be separated by a minimum of 25 kHz, or the 20 dB bandwidth of the hopping channel, whichever is the greater. Channel hopping frequencies may be selected at the system, and/or the hopping rate may be pseudo-random in nature. On average, each channel hopping frequency may be used equally. The receiver bandwidth may match that of the transmitter and may hop in synchronization with the transmitter. A maximum 20 dB bandwidth of the hopping channel may be 500 kHz. If the 20 dB bandwidth is less than 250 kHz, the system may use at least 50 channels. In this case, the average dwell time on a particular channel may not exceed 400 ms within a 20 second period, and/or transmit power may be limited to 30 dBm. If the 20 dB bandwidth is 250 kHz or greater, then the system may use at least 25 channels. In this case, the average dwell time may not exceed 400 ms within a 10 second period, and/or transmit power may be limited to 24 dBm. For example, the following table illustrates a possible set of specified features for OGRS operation depending on the 20 dB bandwidth of the hopping channels used:

| BW | #Channel | TX Power | On Time | Dwell Time |
|---|---|---|---|---|
| <250 KHz | >=50 | 30 dBm | 400 ms | 20 sec |
| >250 KHz | <=25 | 24 dBm | 400 ms | 10 sec |

Figure 22:
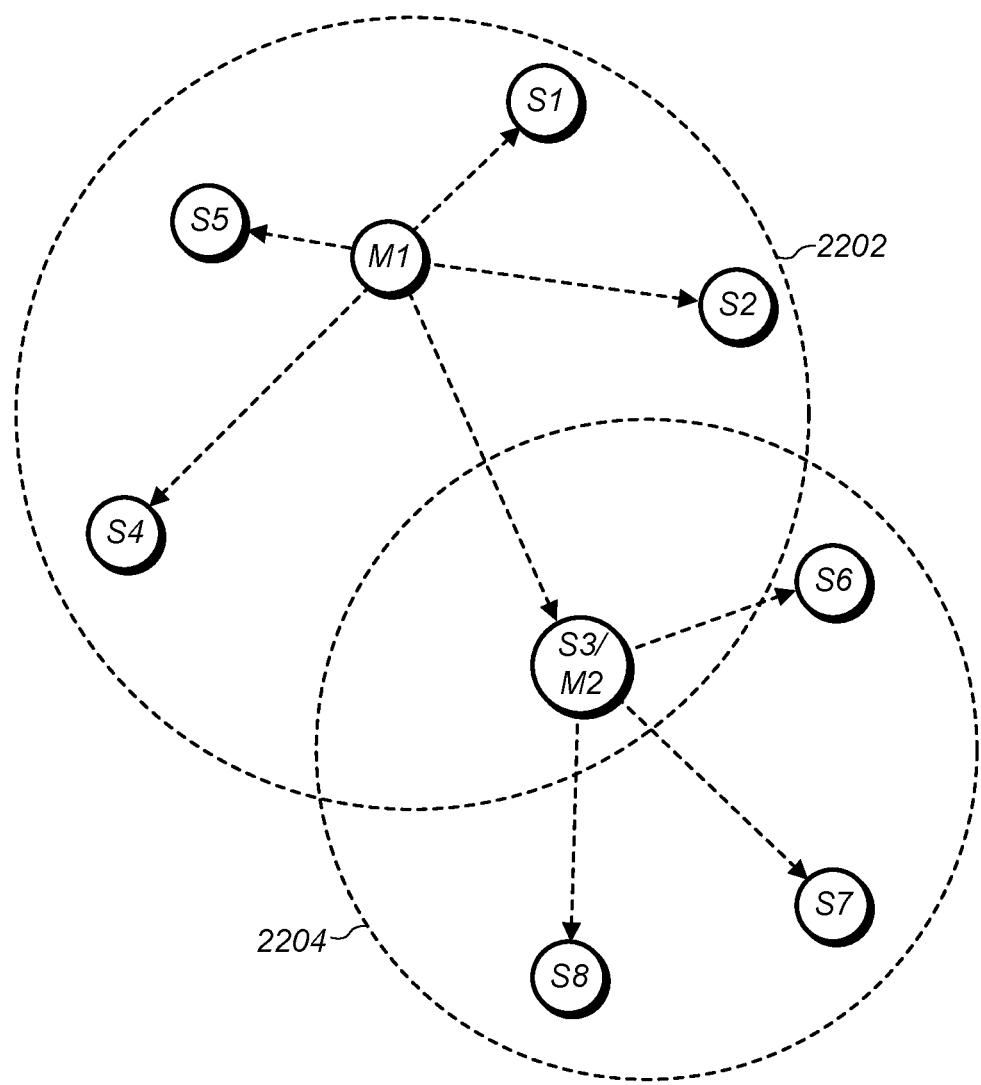
FIG. 22 illustrates an exemplary possible off grid radio service (OGRS) communication system, according to some embodiments.

FIG. 22 illustrates aspects of an exemplary possible OGRS communication system, according to some embodiments. As shown, the system may include a first OGRS group 2202 and a second OGRS group 2204. In a given environment, an OGRS group may operate independently, or multiple OGRS groups may co-exist, e.g., as illustrated in FIG. 22. Each of the groups may have a group master and group members; for example, the first OGRS group 2202 may include a 'master' M1, along with several 'slaves' S1, S2, S3, S4, S5. A master in a group may transmit synchronization channels to which other members in the group, and any devices that wish to join the group, may obtain synchronization from the synchronization signals provided by the master. For example, the synchronization channel(s) may assist with bringing all the members in the group to a common frequency and time, and may be helpful for the nodes in the group for later communication.

Synchronization can be extended when a particular node in the group is below a threshold, e.g., to facilitate the discovery and serving of new nodes that are beyond the current group's range. For example, node S3 in the first OGRS group 2202 may (e.g., based on distance from/signal strength of M1) determine to establish the second OGRS group 2204 and may act as the master M2 for the second OGRS group 2204, which may be joined by nodes S6, S7, S8, as shown.

Since OGRS may be designed as a synchronized protocol, it may be important to specify time and frequency synchronization signals and procedures for OGRS systems, e.g., potentially including direct narrowband primary synchronization signals (D-NPSS) and direct narrowband secondary synchronization signals (D-NSSS). The synchronization procedure may be designed such that one group or multiple groups can co-exist in a given environment without causing mutual interference.

As one possiblity, the D-NPSS may use the Zadoff-Chu (ZC) sequence as defined in section 10.2.7.1.1 of 3GPP TS 36.211, among various possibilities. Any or all of the following procedures may be used in conjunction with the ZC sequence, e.g., for better range. The ZC sequence may be repeated on all 14 OFDM symbols of a subframe (e.g., to help with link budget, for example providing approximately 1 dB improvement, according to some embodiments). A cover code of length 14, e.g., generated either by an m-sequence or kasami sequence, may be used. The resource elements mapping may bypass the DFT, e.g., being provided directly to the IFFT to generate the time-domain samples (e.g., similar to downlink, or to demodulation reference signals in uplink, in LTE). Subcarrier spacing of 15 kHz may be used, e.g., to help with the frequency offset estimation. Additionally, the mapping in the time domain can alternate between the sequence and its conjugate in every OFDM symbol. Differential detection may discriminate the timing and the frequency offset in this case, as one possibility.

According to some embodiments, a number of repetitions of the D-NPSS may be targeted, e.g., to support a desired communication range for the OGRS system. For example, as one possibility, in order to achieve a desired MCL (163 dB) @30 dBm TX power, approximately 100 repetitions of the D-NPSS may be used to reach a $90^{th}$ percentile time acquisition. Other numbers of repetitions may also/alternatively be used, e.g., depending on selected D-NPSS features, the desired communication range for the OGRS system, and/or any of various other possible considerations.

With respect to the D-NSSS, the design may be based on section 10.2.7.2.1 of 3GPP TS 36.211 (as one possibility among various possibilities), and may be extended as follows. The D-NSSS may use all 14 OFDM symbols of a subframe, in which case a ZC sequence of length 167 may be used, with the following parameters:

n=0, 1, . . . , 167 n'=n mod 167 m=n mod 128

$u=N_{ID}^{cell}$ mod t+3

$$t = N_{ID}^{Ncell}/4 \quad q = \left\lfloor \frac{N_{ID}^{Ncell}}{t} \right\rfloor$$

The cyclic shift $\theta_f$ in frame number $n_f$ may be given by $$\theta_f = \frac{42}{168}(n_f/2) \bmod 4.$$

Figure 23:
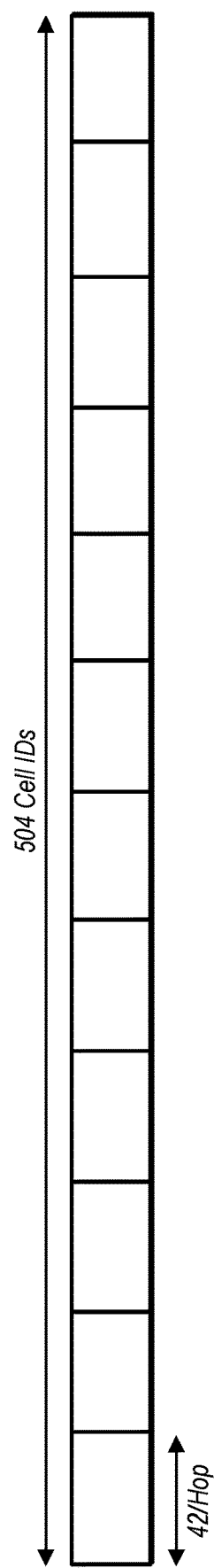
FIG. 23 illustrates an exemplary possible cell ID hop group arrangement that could be used in conjunction with an OGRS communication system, according to some embodiments.

According to some embodiments, a certain number of cells may be allocated as part of the channel design process for OGRS. For example, as one possibility, 504 cell IDs may be available, which may be portioned into 12 hop groups (e.g., each with 42 cell IDs) to assist a node to identify the hop level in the OGRS structure at which the node belongs. FIG. 23 illustrates an example of such a cell ID hop group structure including 12 hop groups, according to some embodiments. Note that other numbers of cell IDs and/or other numbers of hop groups are also possible.

As one possibility, when an existing node in an OGRS group is becoming a SyncRef (e.g., master of a new OGRS group), it may use the cell IDs belonging to a hop group set incremented by one from its current hop group set. For example, if the current OGRS group of the node is in the 1-42 hop group, the new OGRS group may use the cell IDs belonging to the 43-84 hop group. Such partitioning may help avoid all of the groups in a neighborhood using the same frequency and/or time slots to transmit their synchronization signals and master information block, at least according to some embodiments.

One possible feature that may be implemented for regulatory and/or other reasons in OGRS may relate to channel duty cycles. For example, as one possibility, the system may be designed such that a device may not transmit on a given frequency for more than 400 ms on average within a 20 sec period, and/or more generally may follow a duty cycling rule such that devices in a given OGRS group do not transmit more than a specified percentage (e.g., 2%) of the time in any given frequency channel.

Figure 24:
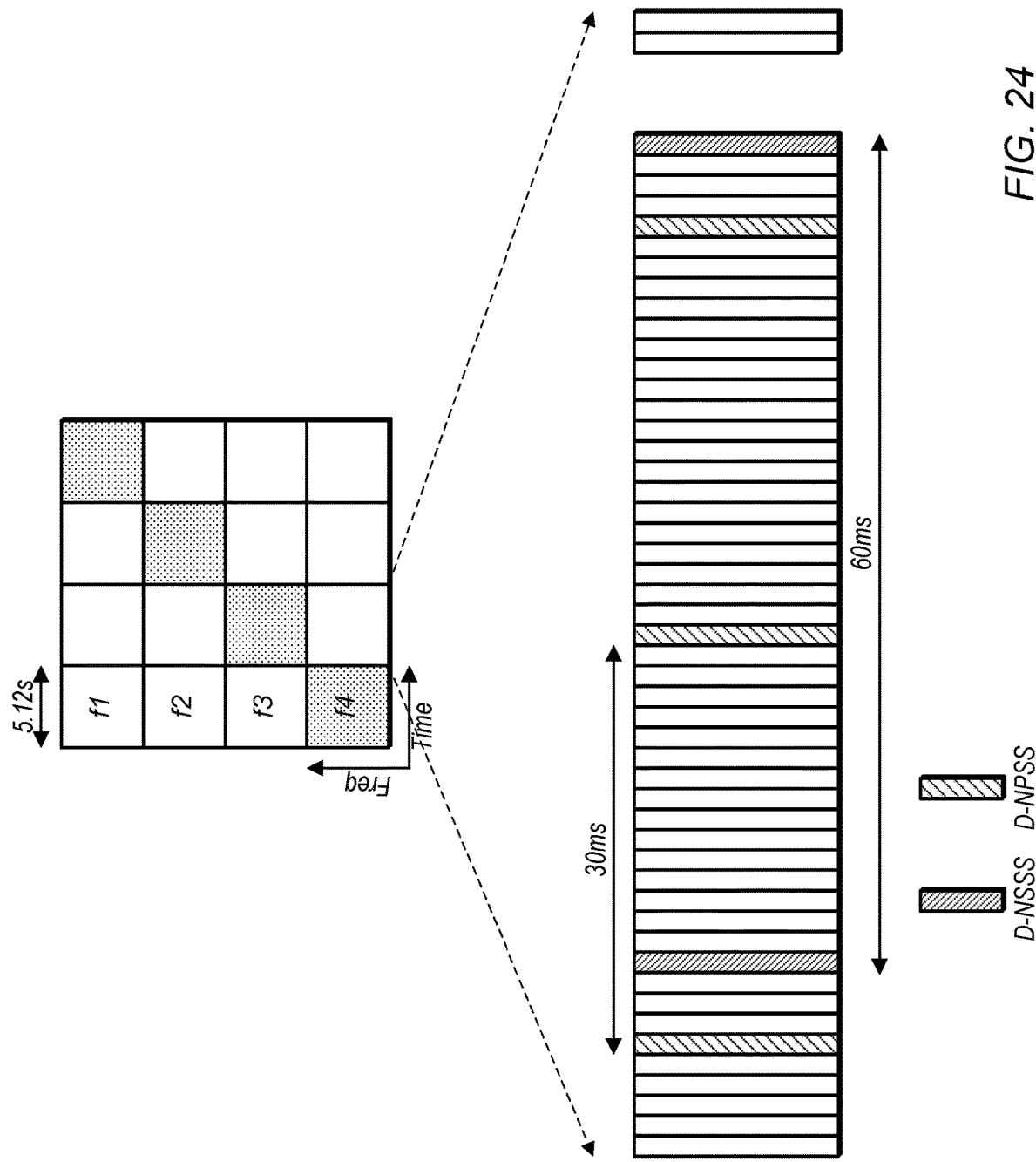
FIG. 24 illustrates an exemplary possible frequency hopping arrangement for providing synchronization signals in an OGRS communication system, according to some embodiments.

One possible design for D-NPSS/D-NSSS providing such a feature may include transmitting the D-NPSS for 1 ms out of every 30 ms, and transmitting the D-NSSS for 1 ms out of every 60 ms, for a duration of 5.12 seconds in a first channel. Then, the same sequence may be repeated in a total of 4 adjacent channels (e.g., such that each channel is used for 5.12 s out of every 20.48 s). Such a design, which may satisfy the 2% duty cycling rule, is illustrated in FIG. 24.

It may be recognized that such a design may represent a tradeoff between the latency (e.g., the total time for a device to acquire synchronization) and the complexity (e.g., the potential additional receiver hardware and/or software complexity arising from the frequency hopping). If the goal is to reduce the latency, then the periodicity of transmitting the synchronization signals could be increased, but the number of channels the synchronization signals hop over may also be increased.

A more generalized multi-channel approach could include using a fixed chunk of bandwidth corresponding to X (e.g., 4, the example of FIG. 24) adjacent channels (e.g., 800 kHz+separation band). The D-NPSS may be transmitted every Yms (e.g., Y=30 ms, in the 4 channel example), and the D-NSSS may be transmitted every Zms (e.g., Z=60 ms, in the 4 channel example) for a duration of T seconds (e.g., T=5.12 s, in the 4 channel example) on each channel, e.g., such that the transmit time on each channel may be less than a specified duty cycling value (e.g., 2%). The hopping may cycle from the lowest frequency to the highest, or may follow any other desired hopping pattern, as desired.

As another possibility, a single channel approach (e.g., if reduced complexity is preferred) could be used. Such an approach may include using a single channel frequency for the synchronization signals, though such signals may be transmitted more infrequently, e.g, to satisfy the specified duty cycling value. For example, in a system implementing a 2% duty cycling constraint, the D-NPSS may be transmitted every 80 ms, while the D-NSSS may be transmitted every 160 ms, as one possibility. In such a case, the frequency channel used for the synchronization signals may be fixed and known to all users. If desired, the frequency channel used for the synchronization signals can change in a single channel approach, e.g., on a very low time scale.

Figure 25:
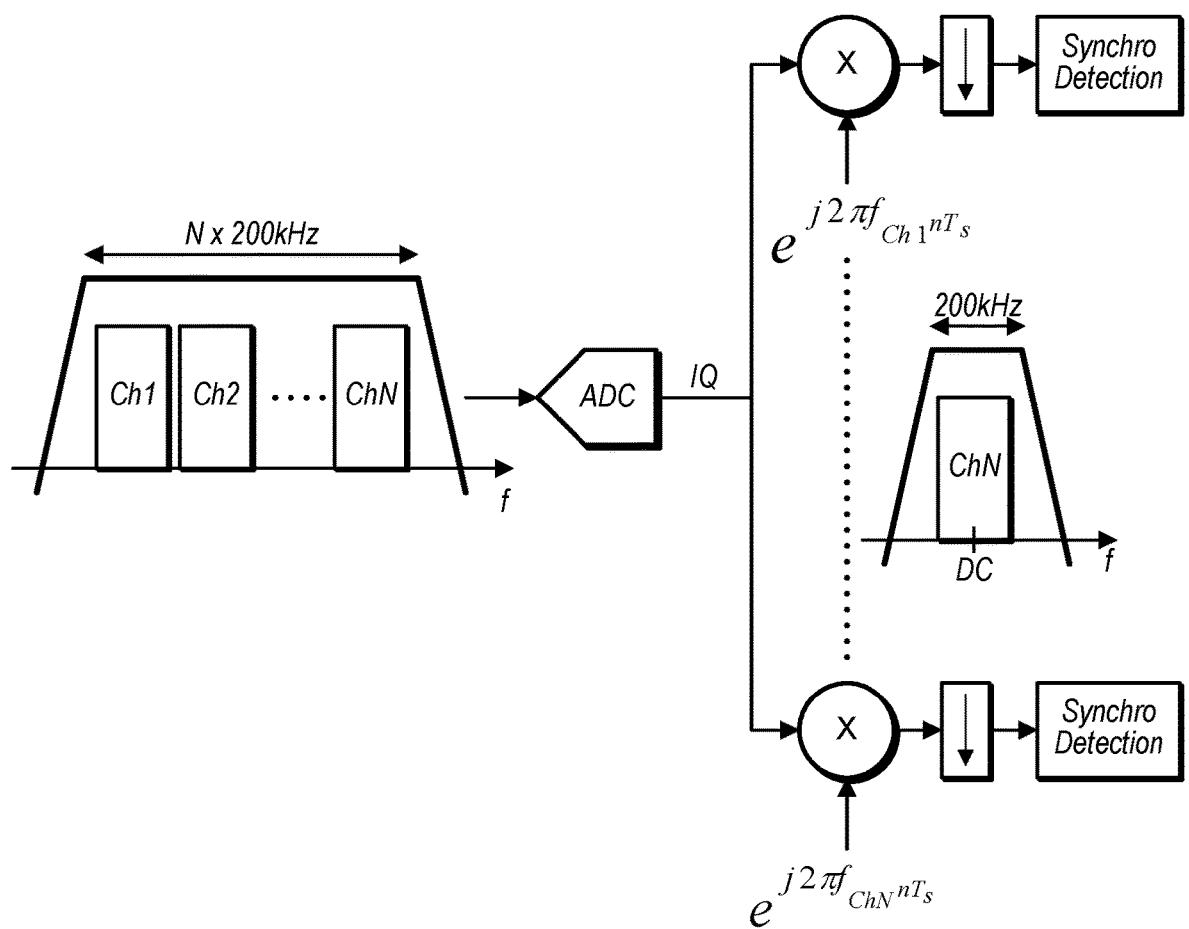
FIG. 25 illustrates aspects of an exemplary possible receiver configuration for receiving synchronization signals in an OGRS communication system, according to some embodiments.
Figure 26:
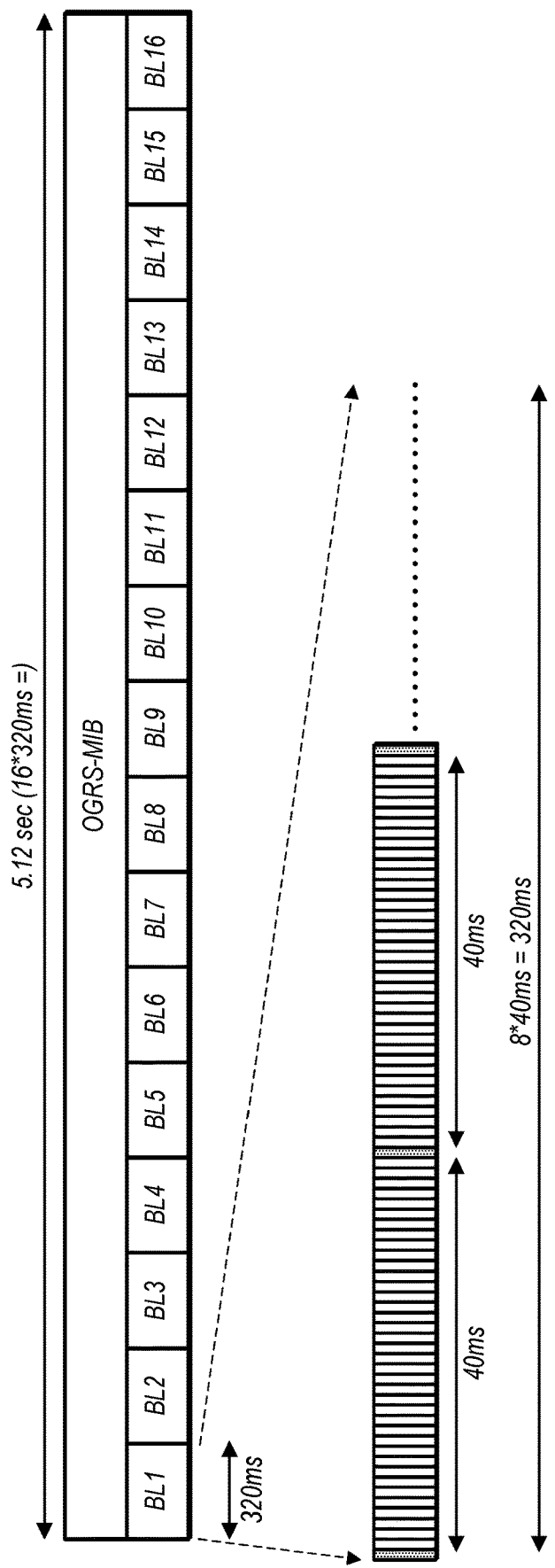
FIG. 26 illustrates an exemplary possible OGRS master information block transmission arrangement, according to some embodiments.

Note that in scenarios in which multiple adjacent channels are used for sync, it can be envisioned that the receiver may always capture the samples for the whole set of adjacent channels (for example in the case of 4 channels used for sync, as in the example of FIG. 24, the receiver may capture approximately 800 kHz (possibly 720 kHz if there is no separation of signal), and the user device may apply 4 different frequency shifts, corresponding to the 4 channels. This may be followed by down sampling to a 240 kHz signal and detection of the D-NPSS/D-NSSS. The potential increase in processing requirement (e.g., MIPS) that this may cause could be justified by the latency reduction, at least according to some embodiments. One possible example of such a receiver arrangement is illustrated in FIG. 25.

In addition to the synchronization signals, a master information block (MIB) may be used to communicate basic system information for an OGRS system, such as system frame number and information related to resource pools for other channels, etc. The MIB in an OGRS system may also be referred to as a direct narrowband MIB (D-NMIB), in some instances.

If desired, the D-NMIB may use the same frequencies (e.g., and frequency hopping arrangement) as the D-NPSS and D-NSSS. Note that in such an instance, the total transmit time on each frequency channel for the D-NMIB, the D-NPSS, and the D-NSSS may be configured such as to comply with a specified duty cycling rule, such as a 2% duty cycling rule.

For example, as one possibility, a 4 channel arrangement such as illustrated in FIG. 24 may be used, and the D-NMIB may be transmitted for 1 ms out of every 40 ms during the 5.12 s on which each of the channels is used in each 20.48 s cycle. Thus, in such a case, the D-NMIB may have 128 ms of occupancy out of each 5.12 s. In this 128 ms, there may be 1 new MIB instance, e.g., such that each instance of the MIB occupies 128 ms and spans a duration of 128*40 ms=5.12 s.

Out of this 128 ms occupancy per MIB, the MIB may be split into 16 blocks, with each of the blocks repeated 8 times. Using such an arrangement, the 2 most significant bits (MSB) of the system frame number (SFN) may be inserted into the D-NMIB, while the remaining 8 least significant bits (LSB) of the total 10 bit SFN may be implicit. This may leave 14 bits of the D-NMIB for indicating discovery/signaling/communication resources, and/or for other purposes, among various possibilities. For example, the D-NMIB may include the following fields, as one possibility:

OGRSFrameNumber BIT STRING (SIZE (2)),

OGRS Disc/Signaling/comm Resources BIT STRING (SIZE (14))

Thus, the number of bits used for frame number may be reduced to 2 bits (MSB), e.g., exploiting the fact that the sync/MIB channel may be transmitted in 16 blocks, and repeated 8 times within every block, on SFN=0 every 40 ms, and with a new MIB being generated every SFN modulo 512=0.

With respect to subframe number, when synchronization signals are propagated by a new SyncRef device initiating a new OGRS group, the new SyncRef device may use a different subframe than the one used by the SyncRef device for the previous OGRS group, e.g., to avoid interference. For this reason, it may be helpful to provide the subframe number in the MIB. For example, this may help ensure that all of the tree is in sync.

However, this may increase the size of the MIB. Thus, as an alternative, it may be possible for the subframe number on which the MIB is transmitted to be related to the cell ID used by the OGRS group, and accordingly to avoid including this additional information in the MIB. Any of various techniques may be used to relate the subframe number on which the MIB is transmitted to the cell ID, as desired.

Another possible consideration may include relating the synchronization hopping scheme to the cell ID, for example such that the synchronization hopping scheme is determined based at least in part on the cell ID. In turn, for example, based on the hopping scheme, a fixed rule could be implemented that the MIB is provided on a specific corresponding subframe. With this approach, it may also be possible to not provide the subframe number in the MIB, e.g., as it may be implicitly signaled.

In the following further exemplary embodiments are provided.

One set of embodiments may include a method, comprising, by a first wireless device: providing device-to-device (D2D) synchronization signals for a D2D communication group, wherein the D2D synchronization signals are provided using a plurality of frequency channels, wherein the D2D synchronization signals are provided on each respective frequency channel of the plurality of frequency channels during a respective portion of a D2D synchronization signal cycle in a sequential manner.

According to some embodiments, the method further comprises, by the wireless device: providing a D2D master information block (MIB) using the plurality of frequency channels, wherein the D2D MIB is also provided on each respective frequency channel of the plurality of frequency channels during the respective portion of the D2D synchronization signal cycle in a sequential manner.

According to some embodiments, a periodicity at which the D2D synchronization signals and the D2D MIB are provided on each respective frequency channel during the respective portion of the D2D synchronization signal cycle and a number of the plurality of frequency channels are configured such that an average transmission time on each of the plurality of frequency channels is below a transmit duty cycle threshold.

According to some embodiments, the first wireless device comprises a member of a second D2D communication group, wherein the method further comprises, by the wireless device: determining a frequency hop group for the D2D communication group based at least in part on a frequency hop group of the second D2D communication group.

According to some embodiments, the method further comprises, by the wireless device: determining that a signal strength of a synchronization reference wireless device of the second D2D communication group is below a signal strength threshold, wherein providing the D2D synchronization signals for the D2D communication group is performed based at least in part on determining that the signal strength of the synchronization reference wireless device of the second D2D communication group is below the signal strength threshold.

Another set of embodiments may include a method for a wireless device to receive D2D synchronization signals for a D2D communication group using a plurality of frequency channels, comprising: by the wireless device: capturing samples for a bandwidth of the plurality of frequency channels; applying a frequency shift to each of the plurality of frequency channels; performing downsampling to a signal corresponding to each of the plurality of frequency channels; and detecting the D2D synchronization signals on the signals corresponding to each of the plurality of frequency channels.

According to some embodiments, the plurality of frequency channels comprise a plurality of adjacent frequency channels.

According to some embodiments, a frequency hopping pattern for the D2D synchronization signals for the D2D communication group is based at least in part on a cell ID for the D2D communication group.

According to some embodiments, a subframe number during which a D2D MIB is provided for the D2D communication group is based at least in part on a cell ID for the D2D communication group.

A further set of embodiments may include a method, comprising: by a first wireless device: performing device-to-device (D2D) synchronization, discovery, and communication with a second wireless device using a frequency channel comprising a frequency width of one physical resource block (PRB).

According to some embodiments, performing D2D synchronization further comprises: transmitting a sidelink narrowband primary synchronization signal (SNPSS) on the frequency channel comprising a frequency width of one PRB; transmitting a sidelink narrowband secondary synchronization signal (SNSSS) on the frequency channel comprising a frequency width of one PRB; transmitting a D2D master information block (MIB) on a sidelink narrowband physical broadcast channel (SNPBCH), wherein the SNPBCH is allocated resources within the frequency channel comprising a frequency width of one PRB.

According to some embodiments, the method further comprises: determining that the wireless device is out of coverage (OOC) with respect to cellular base stations; monitoring a sidelink communication band for D2D synchronization signals based on determining that the wireless device is OOC; wherein the wireless device is unable to decode any synchronization signals while monitoring the sidelink communication band, wherein transmitting the SNPSS, the SNSSS, and the D2D MIB is based at least in part on being unable to decode any synchronization signals while monitoring the sidelink communication band.

According to some embodiments, performing D2D synchronization further comprises: receiving a sidelink narrowband primary synchronization signal (SNPSS); receiving a sidelink narrowband secondarry synchronization signal (SNSSS); receiving a D2D master information block (MIB) on a sidelink narrowband physical broadcast channel (SNPBCH).

According to some embodiments, allocations of portions of the frequency channel comprising a frequency width of one PRB to one or more of D2D synchronization signals, D2D discovery, D2D control communications, and D2D data communications are indicated in the D2D MIB.

According to some embodiments, the D2D discovery is performed using a sidelink narrowband physical discovery channel (SNPDCH) allocated within the frequency channel comprising a frequency width of one PRB.

According to some embodiments, the D2D communication comprises control communication performed using a sidelink narrowband physical control channel (SNPCCH) and data communication performed using a sidelink narrowband physical shared channel (SNPSCH) allocated within the frequency channel comprising a frequency width of one PRB.

According to some embodiments, wherein two or more frequency channels each comprising a frequency width of one PRB are aggregated to perform the D2D discovery and communication, wherein a first frequency channel is used for D2D discovery, wherein a second frequency channel is used for D2D control and data communications.

According to some embodiments, the method further comprises: periodically hopping to a different frequency channel comprising a frequency width of one PRB to perform the D2D synchronization, discovery, and communication according to a predetermined frequency hopping pattern.

According to some embodiments, the method further comprises: performing a listen-before-talk (LBT) procedure prior to transmitting D2D discovery, control, or data messages, wherein no LBT procedure is performed prior to transmitting D2D synchronization signals.

A still further exemplary set of embodiments may include an apparatus, comprising a processing element configured to cause a device to implement any or all parts of the preceding examples.

Another exemplary set of embodiments may include a wireless device, comprising: an antenna; a radio coupled to the antenna; and a processing element operably coupled to the radio, wherein the device is configured to implement any or all parts of the preceding examples.

A yet further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising a processing element configured to cause a first wireless device to:
provide device-to-device (D2D) synchronization signals for a D2D communication group, wherein the D2D synchronization signals are provided using a plurality of frequency channels, wherein the D2D synchronization signals are provided on each respective frequency channel of the plurality of frequency channels during a respective portion of a D2D synchronization signal cycle in a sequential manner, and
wherein a periodicity at which the D2D synchronization signals are provided on each respective frequency channel during the respective portion of the D2D synchronization signal cycle is configured such that an average transmission time on each of the plurality of frequency channels is below a transmit duty cycle threshold.

2. The apparatus of claim 1, wherein the processing element is further configured to cause the first wireless device to:
provide a D2D master information block (MIB) using the plurality of frequency channels, wherein the D2D MIB is also provided on each respective frequency channel of the plurality of frequency channels during the respective portion of the D2D synchronization signal cycle in the sequential manner.

3. The apparatus of claim 2,
wherein a number of the plurality of frequency channels is configured such that the average transmission time on each of the plurality of frequency channels is below the transmit duty cycle threshold.

4. The apparatus of claim 1, wherein the first wireless device comprises a member of a second D2D communication group, wherein the processing element is further configured to cause the first wireless device to:
determine a frequency hop group for the D2D communication group based at least in part on a frequency hop group of the second D2D communication group.

5. The apparatus of claim 4, wherein the processing element is further configured to cause the first wireless device to:
determine that a signal strength of a synchronization reference wireless device of the second D2D communication group is below a signal strength threshold, wherein providing the D2D synchronization signals for the D2D communication group is performed based at least in part on determining that the signal strength of the synchronization reference wireless device of the second D2D communication group is below the signal strength threshold.

6. The apparatus of claim 1,
wherein the plurality of frequency channels comprise a plurality of adjacent frequency channels.

7. The apparatus of claim 1,
wherein a frequency hopping pattern for the D2D synchronization signals for the D2D communication group is based at least in part on a cell ID for the D2D communication group.

8. The apparatus of claim 1,
wherein a subframe number during which a D2D MIB is provided for the D2D communication group is based at least in part on a cell ID for the D2D communication group.

9. The apparatus of claim 1, wherein the processing element is further configured to cause the first wireless device to:
determine that the wireless device is out of coverage (OOC) with respect to cellular base stations; and
monitor a sidelink communication band for D2D synchronization signals based on determining that the first wireless device is OOC;
wherein the first wireless device is unable to decode any synchronization signals while monitoring the sidelink communication band, wherein providing the D2D synchronization signals for the D2D communication group is based at least in part on being unable to decode any synchronization signals while monitoring the sidelink communication band.

10. A wireless device, comprising:
an antenna;
a radio operably coupled to the antenna; and
a processing element operably coupled to the radio;
wherein the antenna, radio, and processing element are configured to:
receive device-to-device (D2D) synchronization signals for a D2D communication group;
wherein the D2D synchronization signals are received on a plurality of frequency channels, wherein the D2D synchronization signals are received on each respective frequency channel of the plurality of frequency channels during a respective portion of a D2D synchronization signal cycle in a sequential manner,
wherein a periodicity at which the D2D synchronization signals are received on each respective frequency channel during the respective portion of the D2D synchronization signal cycle is configured such that an average transmission time on each of the plurality of frequency channels is below a transmit duty cycle threshold.

11. The wireless device of claim 10, wherein the wireless device is further configured to:
receive a D2D master information block (MIB) using the plurality of frequency channels, wherein the D2D MIB is also received on each respective frequency channel of the plurality of frequency channels during the respective portion of the D2D synchronization signal cycle in the sequential manner.

12. The wireless device of claim 10,
wherein a number of the plurality of frequency channels is configured such that the average transmission time on each of the plurality of frequency channels is below the transmit duty cycle threshold.

13. The wireless device of claim 10, wherein the wireless device is further configured to:
capture samples for a bandwidth of the plurality of frequency channels;
apply a frequency shift to each of the plurality of frequency channels;
perform downsampling to a signal corresponding to each of the plurality of frequency channels; and
detect the D2D synchronization signals on the signals corresponding to each of the plurality of frequency channels.

14. The wireless device of claim 10, wherein the wireless device is further configured to:
determine that a signal strength of a synchronization reference wireless device of the D2D communication group is below a signal strength threshold; and
provide D2D synchronization signals for a second D2D communication group based at least in part on the signal strength of the synchronization reference wireless device of the D2D communication group being below the signal strength threshold.

15. The wireless device of claim 10,
wherein the plurality of frequency channels comprise a plurality of adjacent frequency channels.

16. The wireless device of claim 10,
wherein a frequency hopping pattern for the D2D synchronization signals for the D2D communication group is based at least in part on a cell ID for the D2D communication group.

17. A wireless device, comprising:
an antenna;
a radio operably coupled to the antenna; and
a processing element operably coupled to the radio;
wherein the antenna, radio, and processing element are configured to:
determine that a signal strength of a synchronization reference wireless device of a first D2D communication group is below a signal strength threshold;
provide device-to-device (D2D) synchronization signals for a second D2D communication group based at least in part on determining that the signal strength of the synchronization reference wireless device of the first D2D communication group is below the signal strength threshold,
wherein the D2D synchronization signals are provided using a plurality of frequency channels, wherein the D2D synchronization signals are provided on each respective frequency channel of the plurality of frequency channels during a respective portion of a D2D synchronization signal cycle in a sequential manner; and
determine a periodicity at which the D2D synchronization signals is provided on each respective frequency channel during the respective portion of the D2D synchronization signal cycle such that an average transmission time on each of the plurality of frequency channels is below a transmit duty cycle threshold.

18. The wireless device of claim 17, wherein the wireless device is further configured to:
determine a cell ID for the D2D communication group; and determine a frequency hopping pattern for the D2D synchronization signals for the D2D communication group based at least in part on a cell ID for the D2D communication group.

19. The wireless device of claim 17, wherein the wireless device is further configured to:
determine a number of the plurality of frequency channels such that the average transmission time on each of the plurality of frequency channels is below the transmit duty cycle threshold.

20. The wireless device of claim 17,
wherein each frequency channel of the plurality of frequency channel comprises a Narrowband Internet of Things (NB-IoT) carrier.

* * * * *